(12) United States Patent
Matsuda et al.

(10) Patent No.: US 8,435,698 B2
(45) Date of Patent: May 7, 2013

(54) FUEL CONTAINER

(75) Inventors: Yugo Matsuda, Ome (JP); Yasunari Kabasawa, Hanno (JP); Toshimi Kamitani, Fujioka (JP); Kiyoshi Fujisawa, Fujioka (JP)

(73) Assignees: Casio Computer Co., Ltd., Tokyo (JP); Mitsubishi Pencil Co., Ltd., Tokyo (JP)

( * ) Notice: Subject to any disclaimer, the term of this patent is extended or adjusted under 35 U.S.C. 154(b) by 1498 days.

(21) Appl. No.: 11/997,549

(22) PCT Filed: Mar. 22, 2007

(86) PCT No.: PCT/JP2007/055835
§ 371 (c)(1),
(2), (4) Date: Jan. 31, 2008

(87) PCT Pub. No.: WO2007/108503
PCT Pub. Date: Sep. 27, 2007

(65) Prior Publication Data
US 2009/0130531 A1 May 21, 2009

(30) Foreign Application Priority Data
Mar. 22, 2006 (JP) .................. 2006-078845

(51) Int. Cl.
*H01M 8/04* (2006.01)
*B65D 6/12* (2006.01)
(52) U.S. Cl.
USPC .......................... 429/515; 220/4.12; 220/544
(58) Field of Classification Search ............... 220/4.12, 220/4.13, 23.9, 544, 549, 57; 429/515
See application file for complete search history.

(56) References Cited

U.S. PATENT DOCUMENTS

| | | | |
|---|---|---|---|
| 6,506,513 B1 | 1/2003 | Yonetsu et al. | |
| 6,924,054 B2 * | 8/2005 | Prasad et al. | 220/4.12 X |
| 7,172,825 B2 * | 2/2007 | Adams et al. | 429/515 X |
| 2004/0067394 A1 * | 4/2004 | Sadamoto et al. | 429/12 |
| 2005/0019641 A1 * | 1/2005 | Aoyama et al. | 429/34 |
| 2006/0008686 A1 | 1/2006 | Kabasawa | |
| 2006/0127731 A1 * | 6/2006 | Faris | 429/34 |

FOREIGN PATENT DOCUMENTS

| | | |
|---|---|---|
| JP | 2001-093551 A | 4/2001 |
| JP | 2004-281340 A | 10/2004 |
| JP | 2005-209348 A | 8/2005 |

* cited by examiner

*Primary Examiner* — Stephen J. Kalafut
(74) *Attorney, Agent, or Firm* — Holtz, Holtz, Goodman & Chick, P.C.

(57) ABSTRACT

A fuel container 1 comprises: a container main body 2 in which a liquid fuel 4 is housed and fuel exhausting ports 24 and 31 to exhaust the liquid fuel 4 to the outside is formed; a following auxiliary member 71 which is solid, and situated on an end side of the liquid fuel 4 in the container main body 2, the following auxiliary member 71 moving to the sides of the fuel exhausting ports 24 and 31 as the liquid fuel 4 is exhausted; and a following body 5 situated on the end side of the liquid fuel 4, and packed in a space formed by an inner peripheral surface of the container main body 2 and an outer peripheral surface of the following auxiliary member 71, the following body 5 moving to the fuel exhausting ports 24 and 31 as the liquid fuel 4 is exhausted. Then, at least one of the inner peripheral surface of the container main body 2 and the outer peripheral surface of the following auxiliary member 71, which are faced to each other, is made to be uneven.

6 Claims, 24 Drawing Sheets

FUEL CONTAINER

This application is a U.S. National Phase Application under 35 USC 371 of International Application PCT/JP2007/055835 filed Mar. 22, 2007.

TECHNICAL FIELD

The present invention relates to a fuel container housing a liquid fuel therein.

BACKGROUND ART

In recent years, small-sized electronic equipment, such as a cellular phone handset, a notebook-size personal computer, a digital camera, a wrist watch, a personal digital assistance (PDA), and an electronic organizer, has remarkably progressed and developed. As a power source of the electronic equipment, a primary battery, such as an alkaline dry cell and a manganese dry cell, or a secondary battery, such as a nickel-cadmium battery, a nickel-hydrogen battery, and a lithium ion battery, is used. However, when the primary battery and the secondary battery are examined from the point of view of the utilization efficiency of energy, it cannot be necessarily said that they attain the effective utilization of energy. Accordingly, a research and development of a fuel cell which can realize high energy utilization efficiency have been actively performed today in order to be substituted for the primary battery and the secondary battery (see, for example, Patent Document 1).

The fuel cell described in Patent Document 1 is composed of a fuel cell main body and a fuel container. The fuel cell main body is formed of an electrolyte plate put between a fuel electrode and an oxidizer electrode. The fuel container houses a mixed liquid of a liquid fuel, such as methanol, and water, and is connected to the fuel cell main body. A connecting portion is formed in the fuel container, and the fuel container is connected to an introducing pipe by the connecting portion. The liquid fuel is then supplied through the introducing pipe. When the fuel container becomes vacant, it is only necessary to exchange the fuel container for a new one.

[Patent Document 1] Japanese Patent Application Laid-Open Publication No. 2001-93551

DISCLOSURE OF THE INVENTION

Now, when a fuel of a fuel cell is supplied in a cartridge as described above, it is expected that the fuel cartridge is sold to be supplied as a consumption article from the manufacturer of the main body of a product, and that these consumption articles are transported to be supplied to a store and the like. Moreover, when a piece of portable equipment is driven by a fuel cell, the fuel cell is transported or moved in a state of being mounted on the piece of portable equipment by various methods. In such a case, the disadvantage of the occurrence of a mal-operation of a fuel cell cartridge owing to the vibrations produced at the time of the transportation or the movement of a piece of portable equipment or a fuel cartridge, should not be produced. It is considered to be important to give a sufficient vibration characteristic to a fuel cell cartridge in order not to cause a mal-operation of a piece of small-sized portable equipment owing to the disadvantage caused by a vibration or an impact.

Accordingly, the present invention was made in view of the above situation, and aims to provide a fuel container capable of improving the vibration characteristic of the fuel container.

In order to solve the above problem, the invention of the present application includes:

a container main body in which a liquid fuel is housed and a fuel exhausting port to exhaust the liquid fuel to an outside is formed;

a following auxiliary member which is solid, and situated on an end side of the liquid fuel in the container main body, the following auxiliary member moving to a side of the fuel exhausting port as the liquid fuel is exhausted; and a following body situated on the end side of the liquid fuel, and packed in a space formed by an inner peripheral surface of the container main body and an outer peripheral surface of the following auxiliary member, the following body moving to the fuel exhausting port as the liquid fuel is exhausted, wherein at least one of the inner peripheral surface of the container main body and the outer peripheral surface of the following auxiliary member, which are faced to each other, is uneven.

In the invention of the present application, the inner peripheral surface of the container main body and the outer peripheral surface of the following auxiliary member, which are faced to each other, are formed so as to be mutually engaged.

In the invention of the present application, the inner peripheral surface of the container main body and the outer peripheral surface of the following auxiliary member respectively have comb teeth-shape.

In the invention of the present application, at least one surface of the inner peripheral surface of the container main body and the outer peripheral surface of the following auxiliary member has a surface area larger as compared with a case where the one surface is smooth.

BEST MODE FOR CARRYING OUT THE INVENTION

The best modes for implementing the present invention will be described below with reference to the attached drawings. Incidentally, although various technically preferable limitations for implementing the present invention are given to the embodiments to be described below, these limitations are not intended to limit the scope of the invention to the following embodiments and shown examples.

Figure 1:
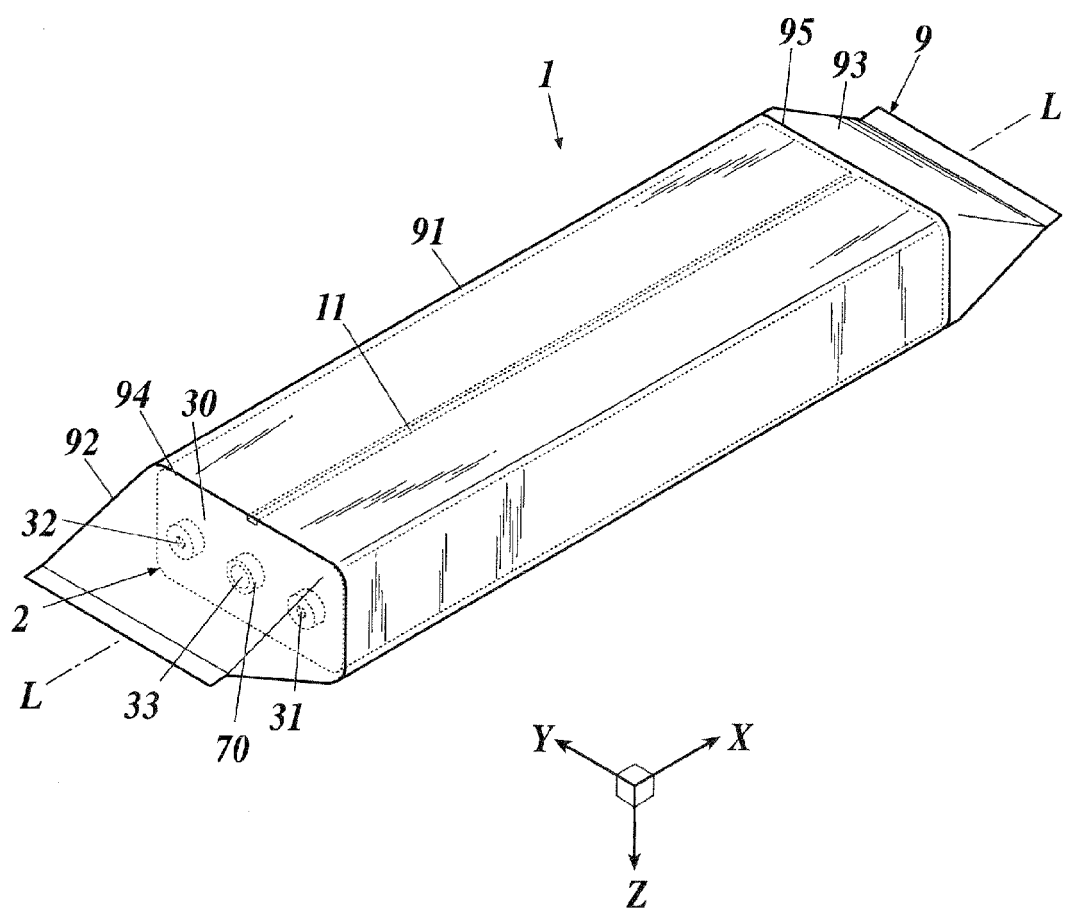
FIG. 1 is a perspective view of a fuel container 1.

FIG. 1 is a perspective view of a fuel container 1 in an embodiment to which the present invention is applied. As shown in FIG. 1, the fuel container 1 comprises an substantially rectangular parallelepiped-shaped container main body 2 in which a liquid fuel is housed, and a packaging medium 9 which packs the container main body 2.

Figure 2:
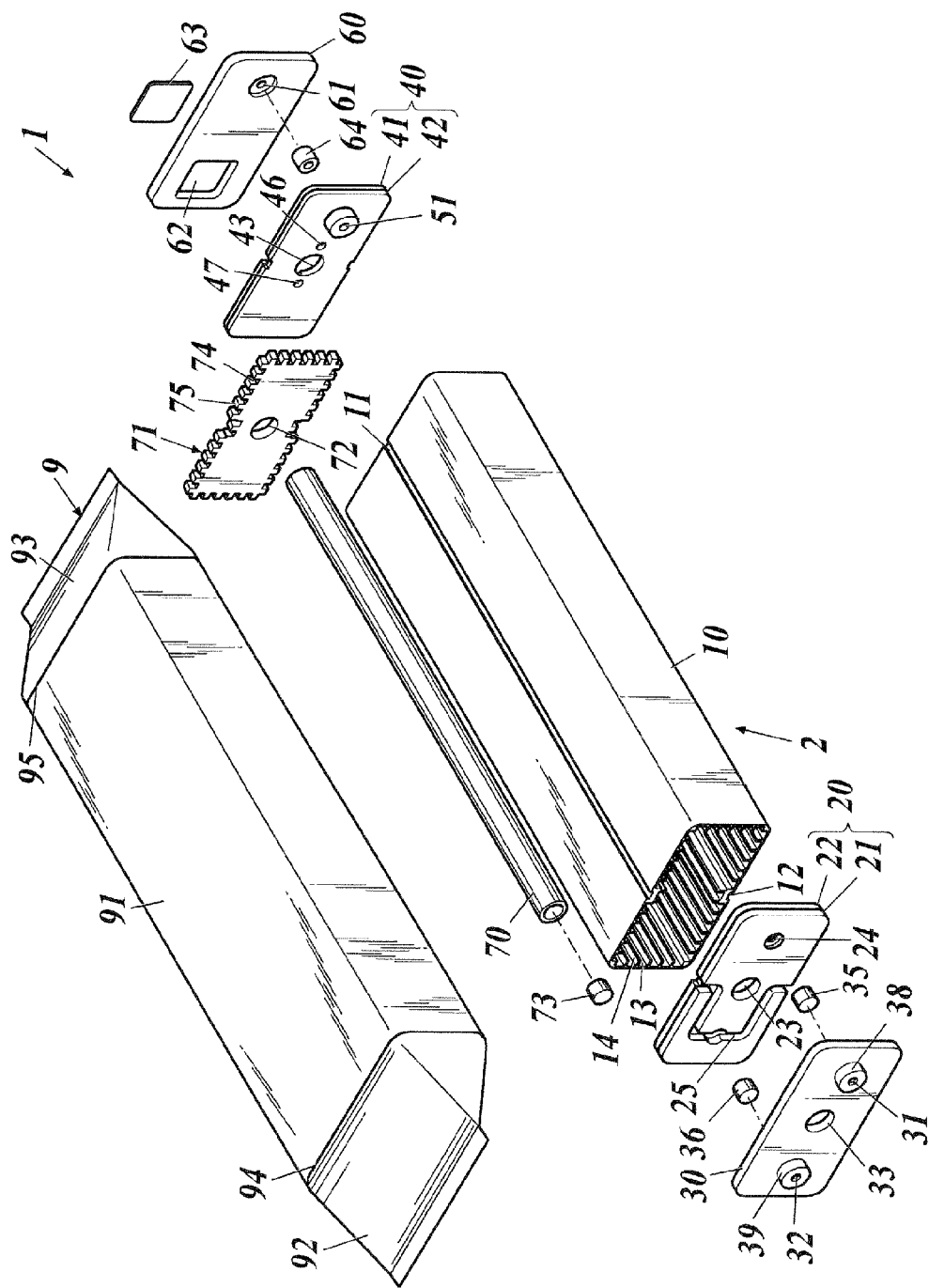
FIG. 2 is an exploded perspective view of the fuel container 1.
Figure 3:
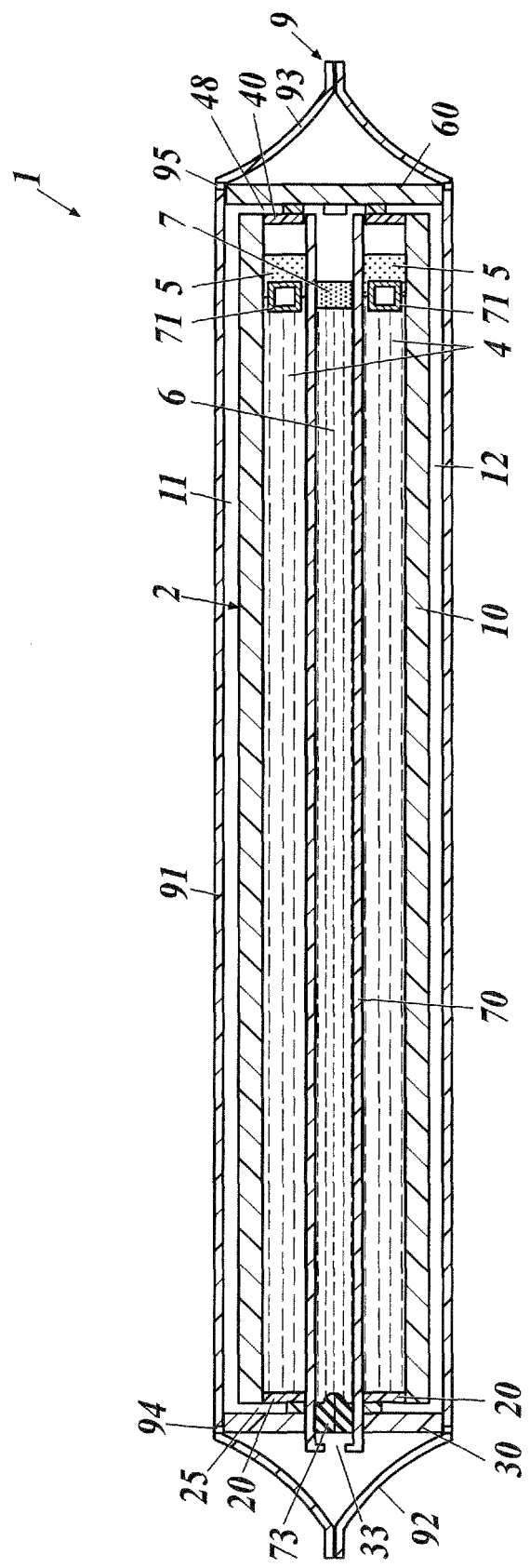
FIG. 3 is an end view of a longitudinal section along a line L-L.
Figure 4:
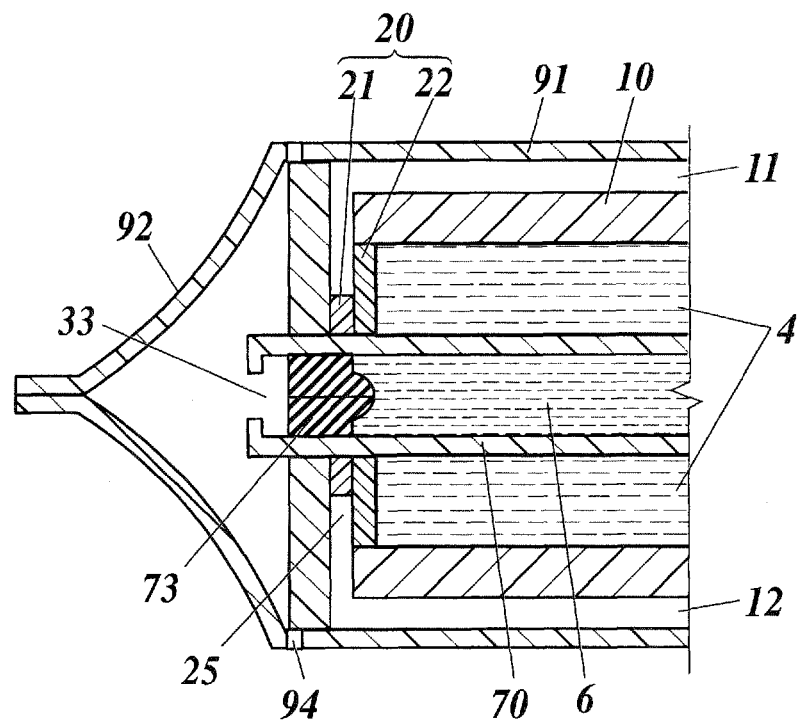
FIG. 4 is a view of expanding a front portion of the fuel container 1 in the end view of FIG. 3.
Figure 5:
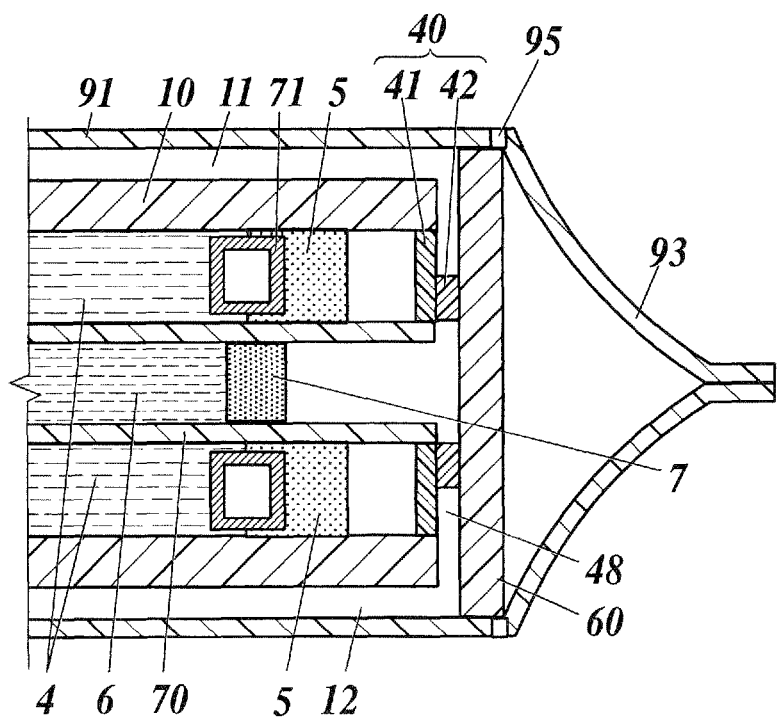
FIG. 5 is a view of expanding the rear portion of the fuel container 1 in the end view of FIG. 3.
Figure 6:
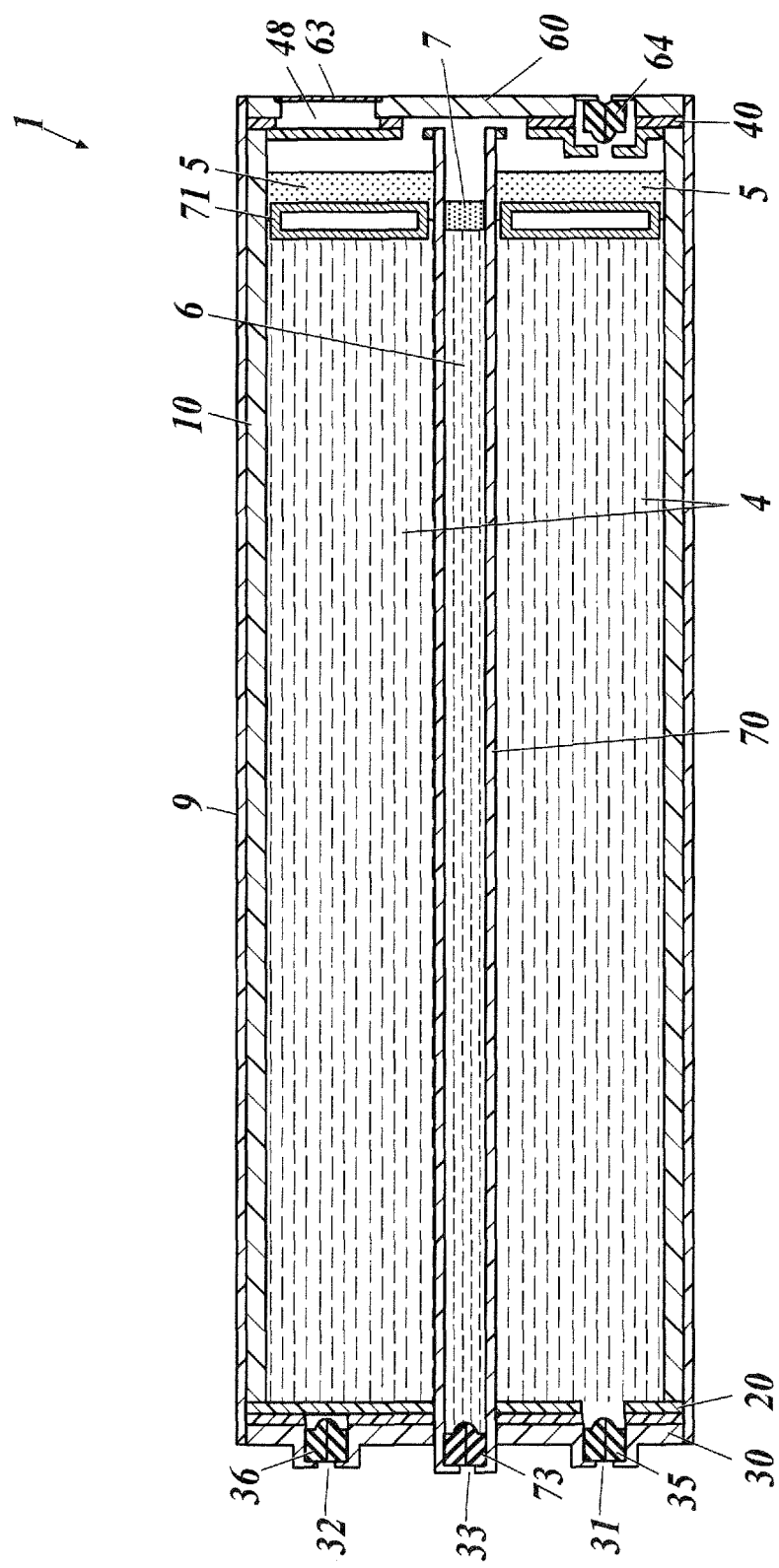
FIG. 6 is an end view of the cross section along the line L-L.
Figure 7:
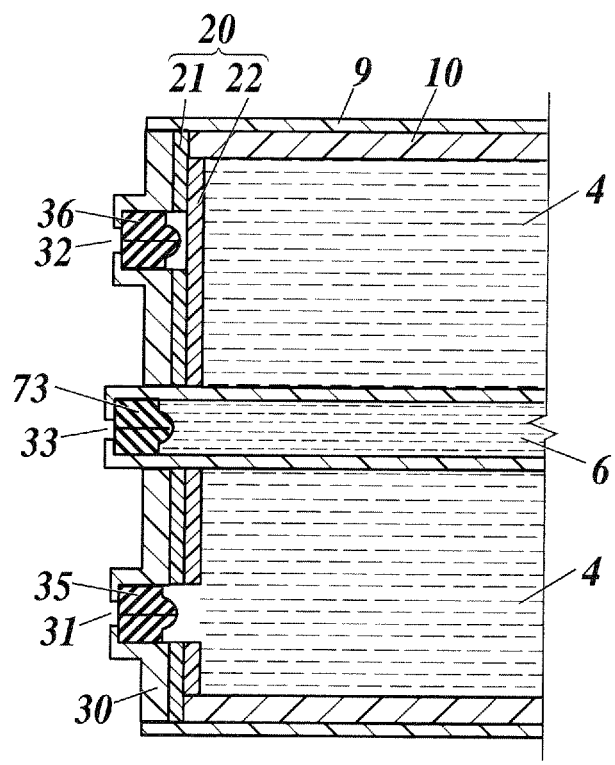
FIG. 7 is a view of expanding the front portion of the fuel container 1 in the end view of FIG. 6.
Figure 8:
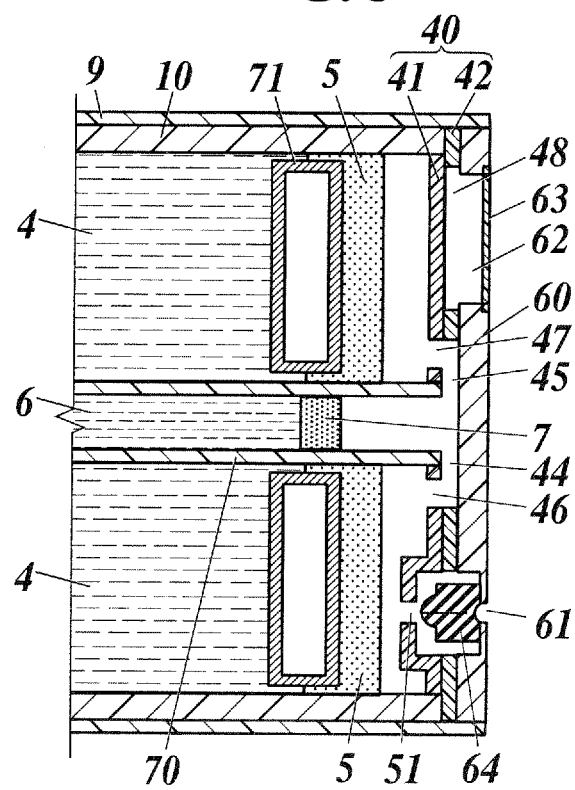
FIG. 8 is a view of expanding the rear portion of the fuel container 1 in the end view of FIG. 6.
Figure 9A:
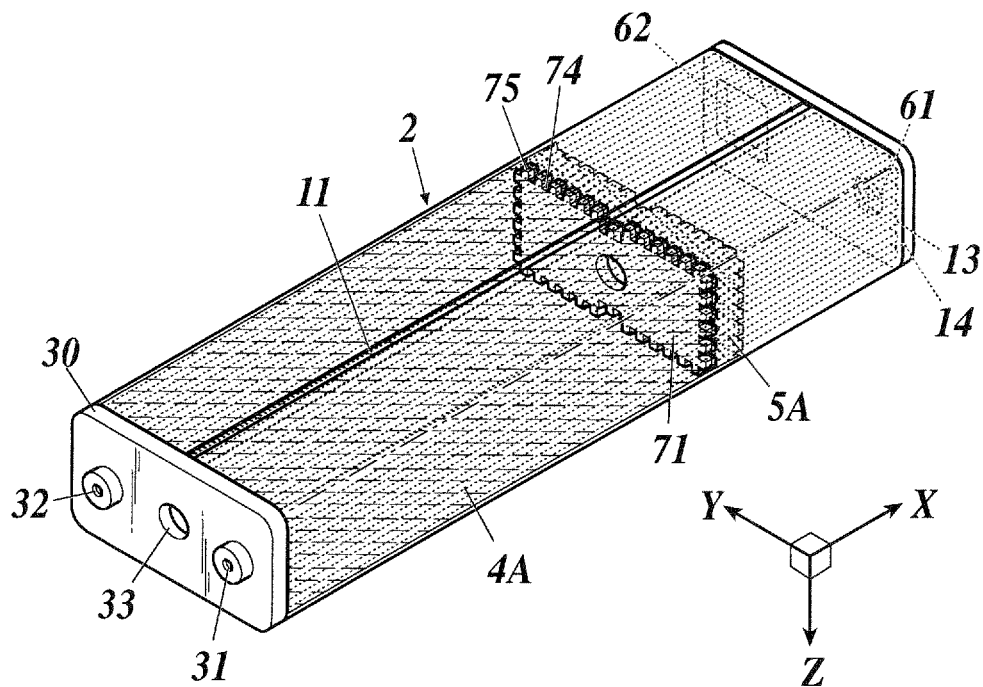
FIG. 9A is a schematic perspective view of a container main body 2 of the fuel container.
Figure 9B:
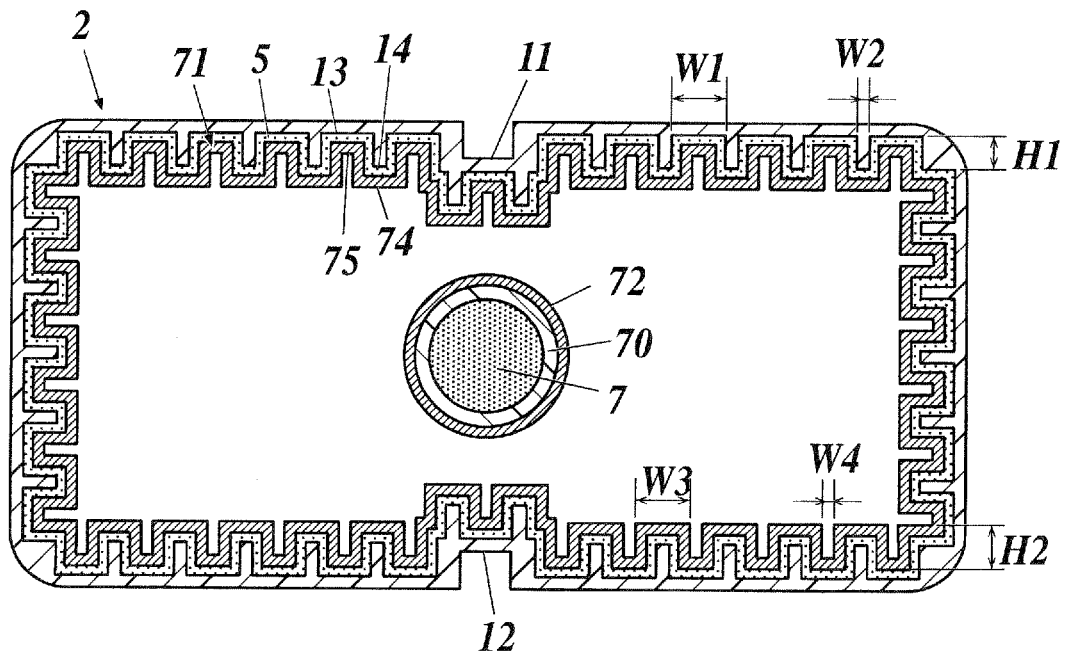
FIG. 9B is a sectional view of a cut surface along a direction perpendicular to the line L-L in a following auxiliary member 71.

The container main body 2 is described with reference to FIGS. 1-8. Here, FIG. 2 is an exploded perspective view of the fuel container 1. FIG. 3 is an end view of a cut surface that passes a center line L along the longitudinal direction X of the fuel container 1 and is parallel to the thickness direction Z of the fuel container 1. FIG. 3 is the end view when the cut surface is seen from the width direction Y of the fuel container 1. FIG. 4 is an expanded view of the front portion of the fuel container 1 in the end view of FIG. 3. FIG. 5 is an expanded view of the rear portion of the fuel container 1 in the end view of FIG. 3. Moreover, FIG. 6 is an end view of the cut surface that passes the center line L and is parallel to the width direction Y of the fuel container 1. FIG. 6 is the end view when the cut surface is seen from the thickness direction Z of the fuel container 1. FIG. 7 is an expanded view of the front portion of the fuel container 1 in the end view of FIG. 6. FIG. 8 is an expanded view of the rear portion of the fuel container 1 in the end view of FIG. 6. Incidentally, FIGS. 6-8 show the state in which lug portions 92 and 93 of the packaging medium 9 are removed. Moreover, FIG. 9A is the whole perspective view showing an outline of the container main body 2 of the fuel container. FIG. 9B is an end view of a cut surface of a following auxiliary member 71 which cut surface is parallel to a Y-Z plane perpendicular to the center line L when the cut surface is seen from the longitudinal direction X of the fuel container 1. Incidentally, a front side inner lid member 20, a rear inner lid member 40, a water housing pipe 70, a following body 7, and the like which will be described below, are not shown in FIG. 9A for the convenience of drawing.

The container main body 2 comprises a case 10 made of a synthetic resin or a metal, and the container main body 2 is composed of the front side inner lid member 20, a front side outer lid member 30, the rear inner lid member 40, a rear outer lid member 60, and the water housing pipe 70, all of which are attached to the case 10.

As shown in FIG. 2, the case 10 is an substantially rectangular pipe-shaped one the inside of which is hollow. The front end and the rear end of the case 10 are open, and the case 10 is formed in a rectangular frame when it is seen from the longitudinal direction X. The opening area of the case 10 is uniform over the whole length in the longitudinal direction X. The outer peripheral surface of the case 10 is plane, and the inner peripheral surface of the case 10 is shaped in comb teeth when they are seen from the direction X. That is, as shown in FIGS. 9A and 9B, a plurality of rectangular concave parts 13 which become hollow at regular intervals, are formed on the inner peripheral surface of the case 10 to extend in lines from the rear end of the case 10 to the front end thereof, and a rectangular projecting part 14 is formed between adjacent concave parts 13 to extend in a line from the rear end of the case 10 to the front end thereof. The concave parts 13 and the projecting parts 14 are shaped in the comb teeth by alternately adjoining to each other in that manner. The width of each of the projecting parts 14 is smaller than that of each of the concave parts 13, and the difference of heights H1 of the adjacent projecting part 14 and the concave part 13 is shorter than the width W1 of the concave part 13 and longer than the width W2 of the projecting part 14. The inner peripheral surface of the case 10 shaped in the comb teeth is adapted to engage with the outer peripheral surface of the following auxiliary member 71 which will be described below. Incidentally, the outer peripheral surface of the case 10 is the outer surface of the container main body 2, and the inner peripheral surface of the case 10 is the inner surface of the container main body 2. A thick wall part between the outer peripheral surface of the case 10 and the inner peripheral surface thereof is the thick wall part of the container main body 2.

Moreover, flow path grooves 11 and 12 are formed to be concave on the bottom surface of the outer peripheral surface of the case 10 and top surface thereof, respectively, when the flow path grooves 11 and 12 are seen from the outer peripheral surface side. The flow path grooves 11 and 12 extend from the rear end of the case 10 to the front end thereof in lines.

As the material of the case 10, for example, a metal, such as aluminum and stainless, a resin, colored glass, earthenware, porcelain and the like can be cited when light transmitting is not required. When any one of light transmitting to enable a liquid fuel 4 enclosed in the case 10 to be seen from the outside, gas impermeability, the cost reduction at the time of manufacture and assembly, and the ease of manufacture is for example considered, a case that is made of a single layer structure or a multilayer structure of two-layer structure or more that has the above respective characteristics can be preferably cited. That is, the single layer structure includes a single resin or a mixture of two kinds of resins of polypropylene, polyvinyl alcohol, ethylene-vinyl alcohol copolymer resin, polyacrylonitrile, nylon, cellophane, polyethylene terephthalate, polycarbonate, polystyrene, polyvinylidene chloride, and polyvinyl chloride; and colorless glass. The multilayer structure includes one produced by coating alumina, silica, or diamondlike carbon (DLC) on the surface of any one of the above resins or the mixtures of the resins. In case of the multilayer structure, when at least one layer is made of the resin having the above-mentioned performance (gas impermeability), even when the residual layers are made of gas permeable resins, the residual layers offer no problem. Thus, the effect of complementing the gas shielding performance of the packaging medium can be expected.

The opening on the front end side of the case 10 is blocked up by the front side inner lid member 20, and the rear surface of the front side outer lid member 30 is joined on the front surface of the front side inner lid member 20. Consequently, the rear surface of the front side inner lid member 20 becomes the front side inner surface of the container main body 2; the front surface of the front side outer lid member 30 becomes the front side outer surface of the container main body 2; and the part between the rear surface of the front side inner lid member 20 and the front surface of the front side outer lid member 30 becomes the front side thick wall part of the container main body 2.

Moreover, the opening of the case 10 on the rear end side is blocked up by the rear inner lid member 40, and the front surface of the rear outer lid member 60 is joined onto the rear surface of the rear inner lid member 40. Consequently, the front surface of the rear inner lid member 40 becomes the rear side inner surface of the container main body 2; the rear surface of the rear outer lid member 60 becomes the rear side outer surface of the container main body 2; and the part between the front surface of the rear inner lid member 40 and the rear surface of the rear outer lid member 60 becomes the rear side thick wall part of the container main body 2.

Figure 10:
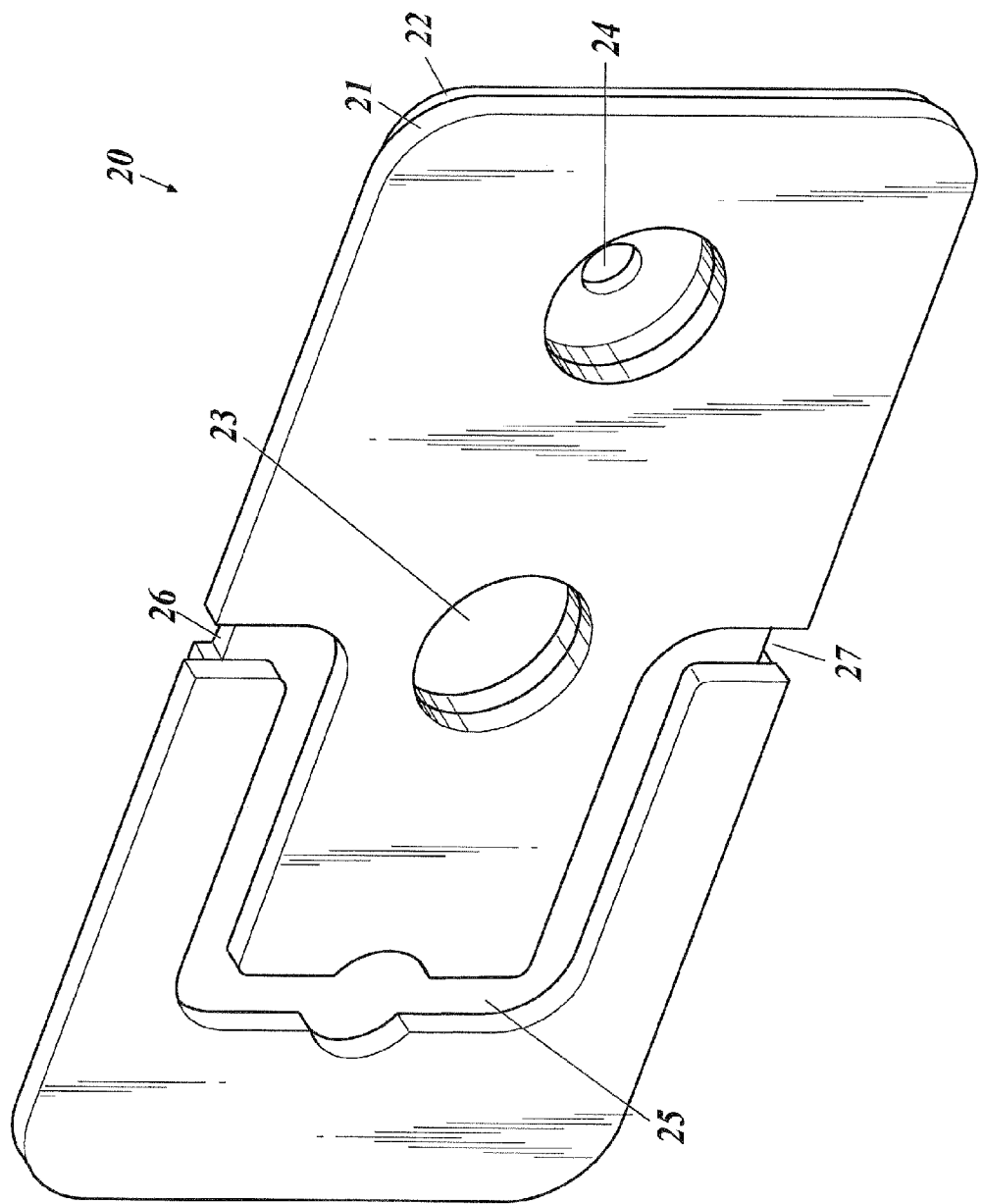
FIG. 10 is a perspective view of a front side inner lid member 20.
Figure 11:
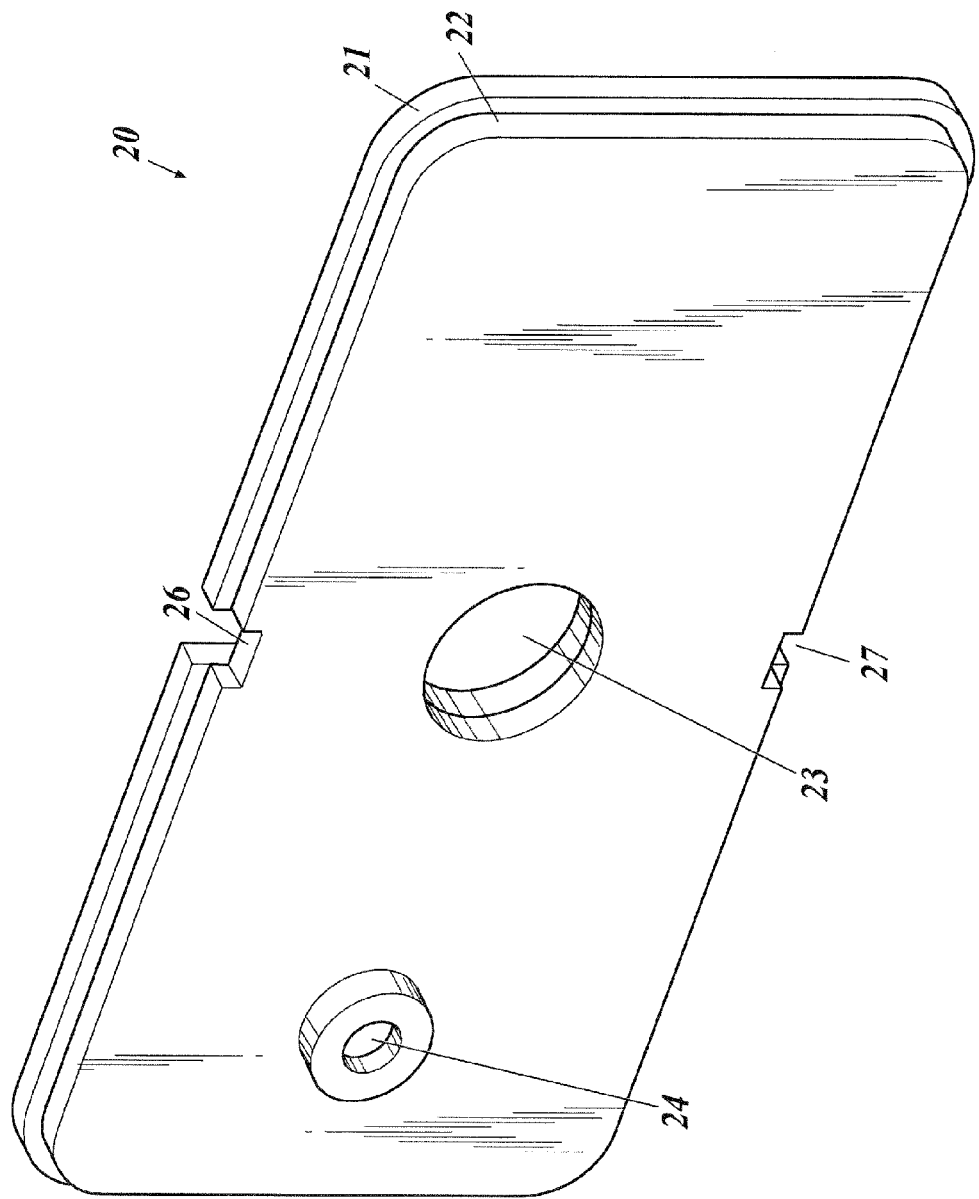
FIG. 11 is another perspective view of the front side inner lid member 20.
Figure 12:
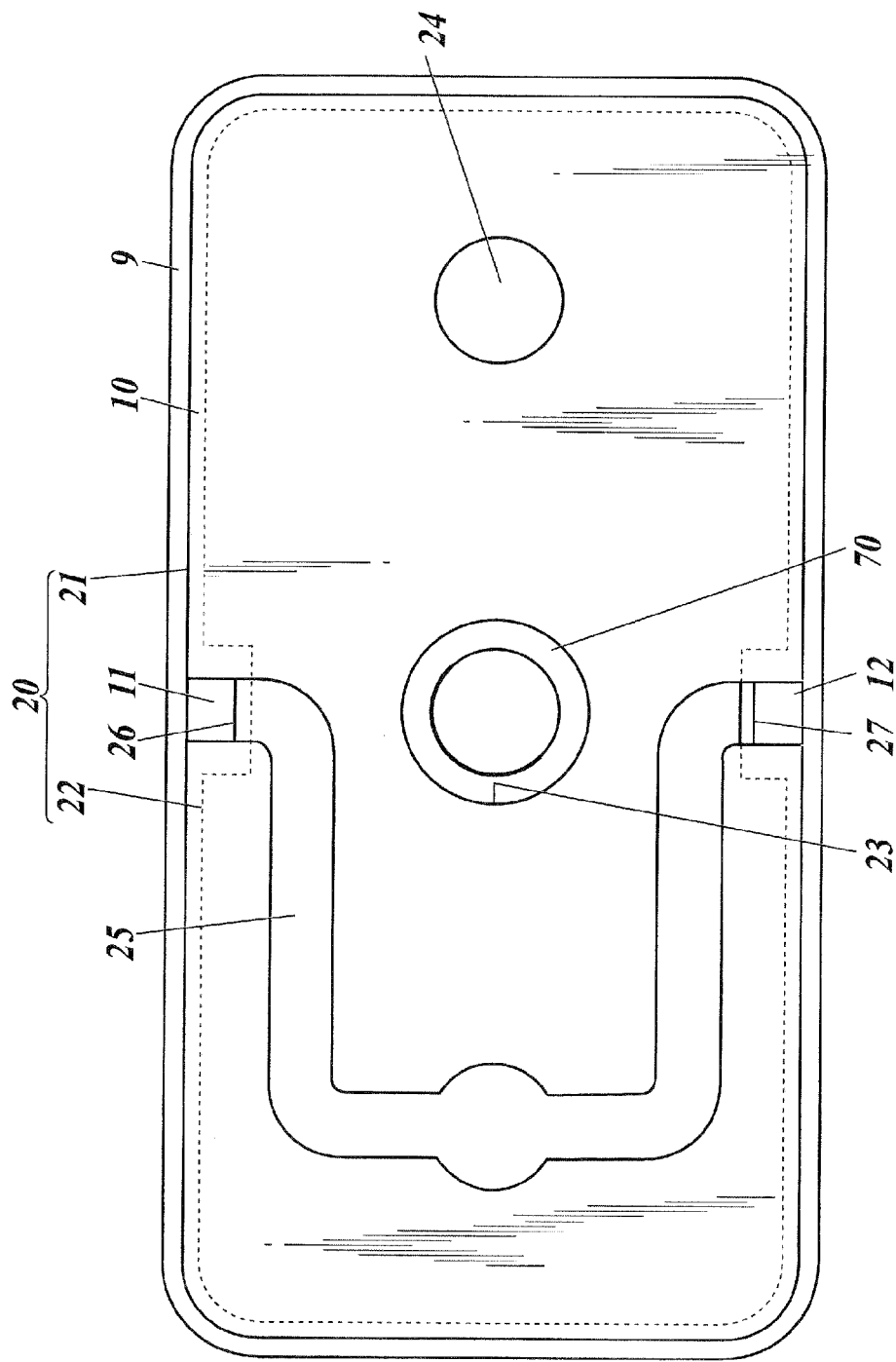
FIG. 12 is a front view of a state in which the front side inner lid member 20 is fitted in a case 10.

The front side inner lid member 20 is described with reference to FIGS. 10-12. FIG. 10 is a perspective view of the front side inner lid member 20 when it is seen diagonally from the front side; FIG. 11 is a perspective view of the front side inner lid member 20 when it is seen diagonally from the rear side; and FIG. 12 is a front view of the front side inner lid member 20 in the state in which the case 10 is blocked up.

The front side inner lid member 20 comprises a first layer 21, and a second layer 22 which is firmly adhered or fixed to the first layer 21. The circumference of the first layer 21 is larger than that of the second layer 22; the circumference of the first layer 21 accords with the outer edge of the front end surface of the case 10; and the circumference of the second layer 22 accords with the inner edge of the front side opening of the case 10.

Because the circumference of the second layer 22 is located to be more inside than the circumference of the first layer 21 by the wall thickness of the front end of the case 10, the second layer 22 fits into the front side opening of the case 10, so that the circumference of the second layer 22 adhere closely to the inner wall of the case 10, in the state in which the front side inner lid member 20 blocks up the front side opening of the case 10. The circumference of the first layer 21 accords with the outer edge of the front end surface of the case 10, and the edge portion of the first layer 21 is superposed on the front end surface of the case 10.

A water exhausting port 23 penetrating the front side inner lid member 20 from the front surface of the first layer 21 to the rear surface of the second layer 22, is perforated at the central part of the front side inner lid member 20, and a fuel exhausting port 24 penetrating the front side inner lid member 20 from the front surface of the first layer 21 to the rear surface of the second layer 22, is perforated on the right side of the water exhausting port 23.

Moreover, a slit 25 is formed in the first layer 21, and the second layer 22 is adhered or fixed to the first layer 21, so that the slit 25 becomes a groove. The slit 25 is formed to be continuous from the upper edge of the first layer 21 to the lower edge of the first layer 21; the slit 25 winds so as to avoid the water exhausting port 23; and the width of the slit 25 widens at a position corresponding to an air exhausting port 32 to be described below.

A notch 26 is formed in the upper edge portion of the second layer 22 at the position that superposes on the upper end portion of the slit 25, and the upper end portion of the slit 25 is connected to the front end portion of the flow path groove 11 of the case 10 through the notch 26. A notch 27 is formed in the lower edge portion of the second layer 22 at the position that superposes on the lower end portion of the slit 25, and the lower end portion of the slit 25 is connected to the front end portion of the flow path groove 12 of the case 10 through the notch 27.

Figure 13:
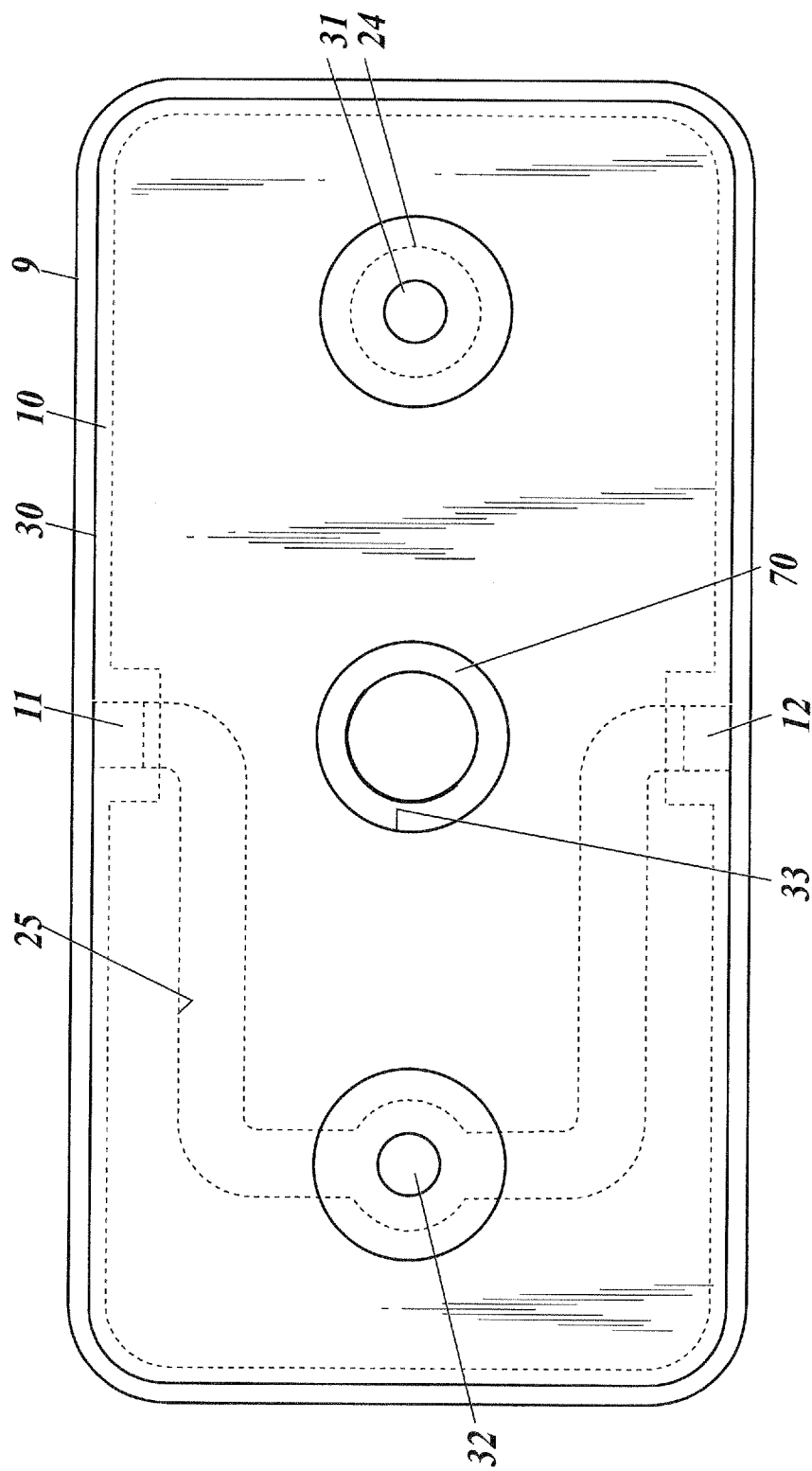
FIG. 13 is a front view of a state in which a front side outer lid member 30 is superposed on the front side inner lid member 20.

FIG. 13 is a front view of the front side outer lid member 30 in the state of being superposed on the front surface of the front side inner lid member 20. As shown in FIG. 13, the front side outer lid member 30 is superposed on the first layer 21 of the front side inner lid member 20, and consequently the slit 25 is covered by the front side outer lid member 30 and a flow path by the slit 25 is formed. A fuel exhausting port 31, the air exhausting port 32, and a water exhausting port 33 are perforated in the front side outer lid member 30 so as to penetrate the front side outer lid member 30 from the front surface thereof to the rear surface thereof. The water exhausting port 33 is formed at the central part of the front side outer lid member 30, and the fuel exhausting port 31, the water exhausting port 33, and the air exhausting port 32 are arranged linearly along the width direction of the fuel container 1 in the above-mentioned order. Then, the fuel exhausting port 31 is opposed to the fuel exhausting port 24 of the front side inner lid member 20; the water exhausting port 33 is opposed to the water exhausting port 23 of the front side inner lid member 20; and the air exhausting port 32 is opposed to the part having a wider width of the slit 25.

As shown in FIGS. 1, 2, 3, 6, and 7, the circumferences of the fuel exhausting port 31 and the air exhausting port 32 are provided at nipple portions 38 and 39, respectively, provided on the front surface of the front side outer lid member 30 to project therefrom, but the water exhausting port 33 is formed as a through-hole. Consequently, the water exhausting port 33 does not project from the front surface of the front side outer lid member 30 in the state in which the water housing pipe 70 is not inserted, but the front edge of the water housing pipe 70 is provided to project from the front surface of the front side outer lid member 30 in the state in which the water housing pipe 70 is inserted into the water exhausting port 33. The rear surface of the front side outer lid member 30 is formed to be concave at the nipple portions 38 and 39 respectively.

Figure 14:
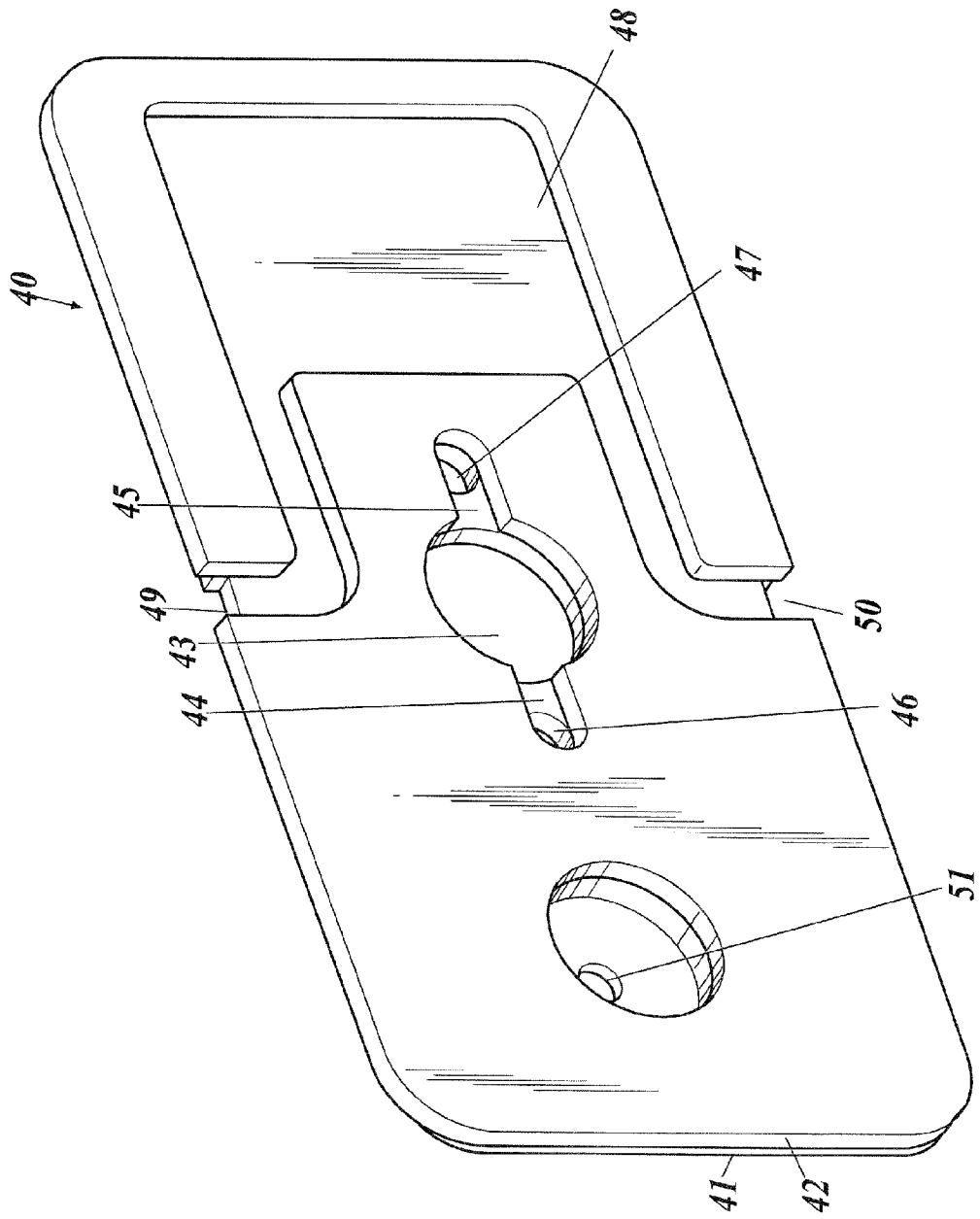
FIG. 14 is a perspective view of a rear inner lid member 40.

The rear inner lid member 40 is described with reference to FIGS. 14 and 15. FIG. 14 is a perspective view of the rear inner lid member 40 when it is seen diagonally from the rear side, and FIG. 15 is a perspective view of the rear inner lid member 40 when it is seen diagonally from the front side.

The rear inner lid member 40 comprises a first layer 41 and a second layer 42 firmly adhered or fixed to the first layer 41. The circumference of the first layer 41 is smaller than that of the second layer 42; the circumference of the first layer 41 accords with the inner edge of a rear side opening of the case 10; and the circumference of the second layer 42 accords with the outer edge of the rear end surface of the case 10.

As shown in FIGS. 5 and 8, because the circumference of the first layer 41 is located more inside than the circumference of the second layer 42 by the wall thickness of the rear end of the case 10, the first layer 41 fits into the rear side opening of the case 10; the circumference of the first layer 41 adheres closely to the inner wall of the case 10; the circumference of the second layer 42 accords with the circumference of the case 10; and the edge portion of the second layer 42 is superposed on the rear end surface of the case 10 in the state in which the rear inner lid member 40 blocks up the rear side opening of the case 10.

Figure 15:
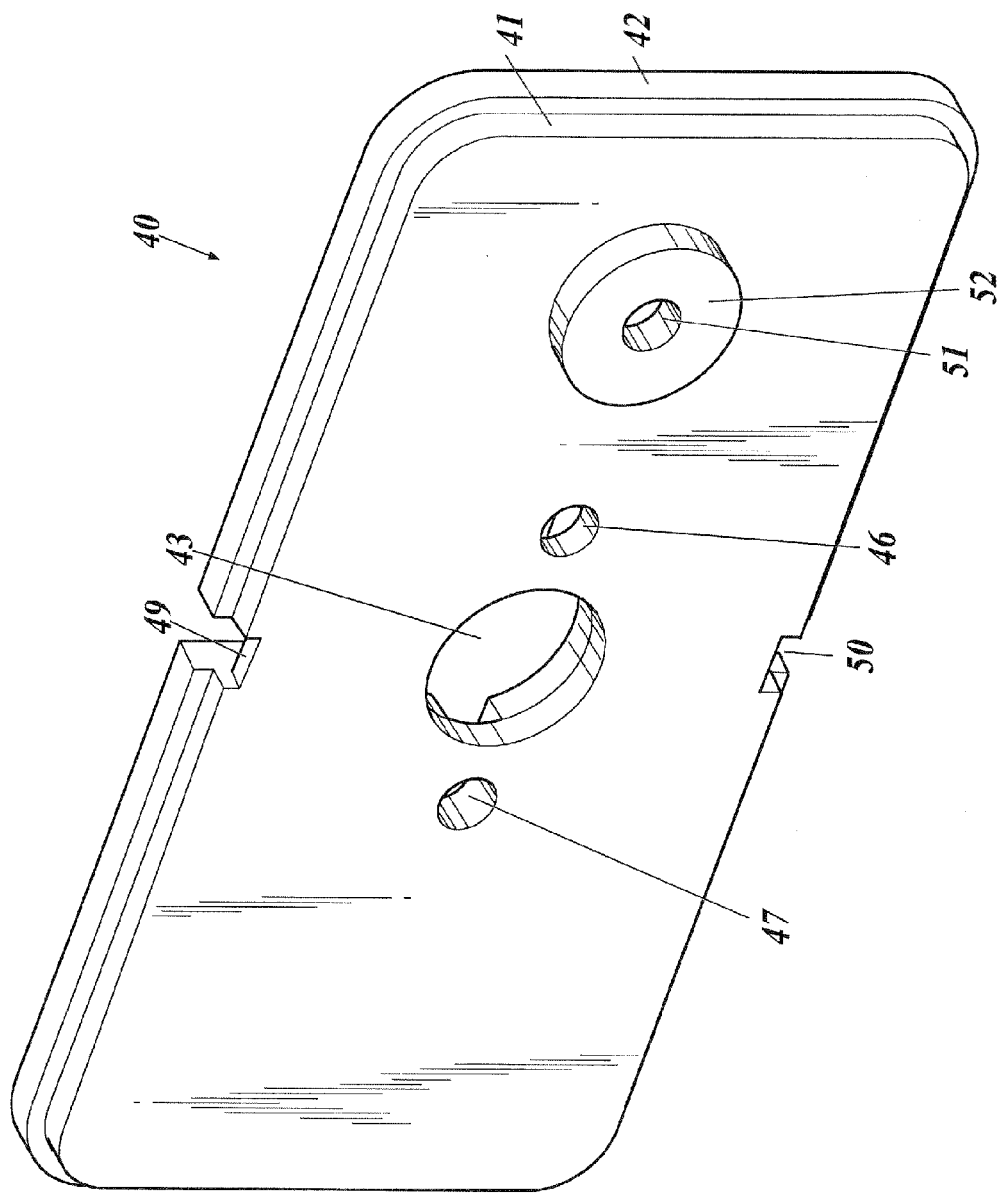
FIG. 15 is another perspective view of the rear inner lid member 40.

As shown in FIGS. 14 and 15, a holding port 43 penetrating the rear inner lid member 40 from the front surface of the first layer 41 to the rear surface of the second layer 42 is perforated at the central part of the rear inner lid member 40. Lateral slits 44 and 45 are formed on the left and right sides of the holding port 43 in the second layer 42, respectively, and the lateral slits 44 and 45 and the holding port 43 are integrally continued. Air vents 46 and 47 are perforated on the left and right sides of the holding port 43 in the first layer 41, respectively; the air vent 46 is connected to the end of the lateral slit 44; and the air vent 47 is connected to the end of the lateral slit 45.

A nipple portion 52 is provided to the second layer 42 to project to the side of the first layer 41, and a through-hole that the nipple portion 52 penetrates is formed in the first layer 41. When the nipple portion 52 is inserted into the through-hole of the first layer 41, the nipple portion 52 becomes the state in which the front edge thereof projects from the front surface of the first layer 41. An air vent 51 is formed in the nipple portion 52, and aerates the rear inner lid member 40 at the front and the back thereof.

Moreover, a slit 48 is formed in the second layer 42. When the first layer 41 is adhered or fixed to the second layer 42, the slit 48 becomes a groove. The slit 48 is continuously formed from the upper edge of the second layer 42 to the lower edge thereof, and winds so as to avoid the holding port 43. Then, the width of the slit 48 widens at a position corresponding to a second air introducing port 62 to be described below.

A notch 49 is formed at a position in the upper edge portion of the first layer 41 at which position the upper edge portion overlaps with the upper end portion of the slit 48, and the upper end portion of the slit 48 is connected to the rear end part of the flow path groove 11 of the case 10 through the notch 49. A notch 50 is formed at a position in the lower edge portion of the first layer 41 at which position the lower edge portion overlaps with the lower end portion of the slit 48, and the lower end portion of the slit 48 is connected to the rear end part of the flow path groove 12 of the case 10 through the notch 50.

Figure 16:
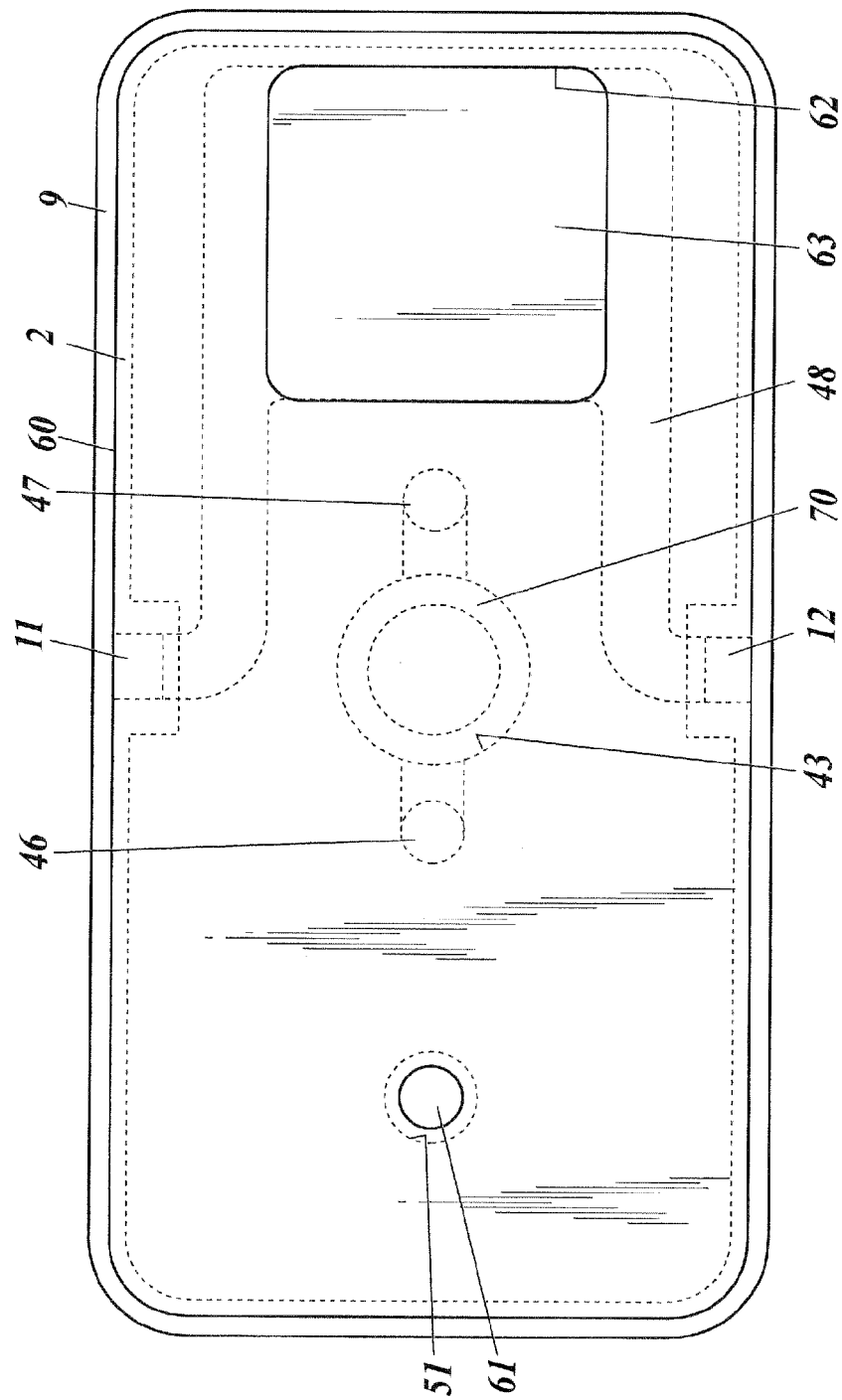
FIG. 16 is a rear view of a state in which a rear outer lid member 60 is superposed on the rear inner lid member 40.

FIG. 16 is a front view of the rear outer lid member 60 in the state of being superposed on the rear surface of the rear inner lid member 40 when the rear outer lid member 60 is seen from the backside thereof. As shown in FIG. 16, because the rear outer lid member 60 is superposed on the second layer 42 of the rear inner lid member 40, the slit 48 is covered by the rear outer lid member 60, and a flow path is formed by the slit 48. Furthermore, the lateral slits 44 and 45 are also covered by the rear outer lid member 60. As shown in FIGS. 2 and 16, a circular pressure adjusting port 61 is formed in the rear outer lid member 60, and also the rectangular second air introducing port 62 is formed in the rear outer lid member 60. The pressure adjusting port 61 is a port to take in the outside air in order to adjust the pressure in a space 65 formed behind following bodies 5 and 7 to be described below; the pressure adjusting port 61 is formed at a position corresponding to the air vent 51; and the air introducing port 62 is formed at a position corresponding to a part of the slit 48 where the slit 48 is widened.

As shown in FIGS. 2-8, the water housing pipe 70 is provided to be disposed in the case 10. One end of the water housing pipe 70 is inserted into the water exhausting ports 33 and 23, and the end projects beyond the front surface of the front side outer lid member 30. The projection height of the projecting part is almost the same as those of the nipple portion 38 of the fuel exhausting port 31, and the nipple portion 39 of the air exhausting port 32. On the other hand, the other end of the water housing pipe 70 is inserted into the holding port 43 of the rear inner lid member 40, and the rear end surface of the water housing pipe 70 does not reach the second layer 42. Consequently, a space is produced between the rear end surface and the holding port 43 in the holding port 43, and the lateral slits 44 and 45 are connected to the inside of the water housing pipe 70.

A check valve 35 to check unnecessary flows of a fluid to flow from the inside of the case 10 to the outside thereof through the fuel exhausting ports 31 and 24 even when an external force is applied to the case 10, is fit into the fuel exhausting ports 31 and 24. The outer diameter of the check valve 35 is smaller than the inner diameter of the nipple portion 38, and is larger than the diameter of the fuel exhausting port 31. Consequently, the check valve 35 does not go outside from the fuel exhausting port 31. To put it concretely, the check valve 35 is a duckbill valve formed in a duckbill-shape, and the check valve 35 is housed in the nipple portion 38 and in the concave part of the fuel exhausting port 24 in the state of facing the duckbill-shaped front end thereof to the inside of the case 10.

A check valve 36 to check unnecessary flows of a fluid to flow from the slit 25 on the inside of the fuel container 1 to the outside thereof thorough the air exhausting port 32 even when an external force is applied to the case 10, is fit into the air exhausting ports 32. The outer diameter of the check valve 36 is smaller than the inner diameter of the nipple portion 39, and is larger than the diameter of the air exhausting port 32. Consequently, the check valve 36 does not go outside from the air exhausting port 32. To put it concretely, the check valve 36 is a duckbill valve formed in a duckbill-shape, and the check valve 36 is housed in the nipple portion 39 and in the slit 25 in the state of facing the duckbill-shaped front end thereof to the inside of the case 10.

A check valve 73 to check unnecessary flows of a fluid to flow from the inside of the water housing pipe 70 to the opening at the end thereof even when an external force is applied to the water housing pipe 70 through the case 10 is fit into the water housing pipe 70 at a position near to the end side of the water exhausting port 33. To put it concretely, the check valve 73 is a duckbill valve formed in a duckbill-shape, and the check valve 73 is fitted into the water housing pipe 70 in the state of facing the duckbill-shaped front end thereof to the rear inner lid member 40.

A check valve 64 to check the flow of a fluid to flow from the inside of the case 10 to the outside thereof through the air vent 51 and the pressure adjusting port 61, is fit into the pressure adjusting port 61. To put it concretely, the check valve 64 is a duckbill valve formed in a duckbill-shape, and the check valve 64 is fitted into a concave part of the circumference of the pressure adjusting port 61 in the state of facing the duckbill-shaped front end thereof to the inside of the case 10. The check valve 64 allows the air to enter the inside of the container main body 2 from the outside thereof in order to buffer a pressure difference when the atmospheric pressure in the inner space behind the following bodies 5 and 7 becomes remarkably lower than the atmospheric pressure on the outside of the container main body 2.

The check valves 35, 36, 64, and 73 are made of elastic materials. As the materials of the check valves 35, 36, 64, and 73, synthetic resins, such as polyvinyl alcohol, ethylene-vinyl alcohol copolymer resin, polyacrylonitrile, nylon, cellophane, polyethylene terephthalate, polycarbonate, polystyrene, polyvinylidene chloride, and polyvinyl chloride; and rubbers, such as natural rubber, isoprene rubber, butadiene rubber, 1,2-poly butadiene rubber, styrene-butadiene rubber, chloroprene rubber, nitrile rubber, butyl rubber, ethylene-propylene rubber, chlorosulfonated polyethylene, acrylic rubber, epichlorohydrin rubber, polysulfide rubber, silicone rubber, fluoro rubber, and urethane rubber, and elastomers can be cited.

Moreover, the water housing pipe 70 penetrates a through-hole 72 of the following auxiliary member 71 which is a solid having no fluidity. The following auxiliary member 71 is formed to be hollow in its inside in order to be structured to be light in proportion to the bulk thereof so as to be able to efficiently slide in contact together with the interface with the liquid fuel 4 which is described below, in the space between the inner wall of the case 10 and the outer wall of the water housing pipe 70 owing to the operation of a slow small stress produced by a movement of the interface with the liquid fuel 4 with the consumption of the liquid fuel 4. The through-hole 72 for inserting the water housing pipe 70 therein is formed at the central part of the following auxiliary member 71. Moreover, the following auxiliary member 71 is adapted to be able to move along the direction X by being guided by the water housing pipe 70.

Moreover, the outer edge of the following auxiliary member 71 is shaped in comb teeth when it is seen from the direction X. That is, as shown in FIGS. 9A and 9B, a plurality of rectangular concave parts 74 which becomes hollow at regular intervals, is formed to extend into the thickness direction of the following auxiliary member 71 on the outer peripheral surface of the following auxiliary member 71, and a plurality of rectangular projecting parts 75 are thereby formed to extend in the thickness direction of the following auxiliary member 71 to be shaped in comb teeth separated by each of the projecting parts 75. The projecting parts 75 and the concave parts 74 alternately adjoin to each other on the outer peripheral surface of the following auxiliary member 71. The projecting parts 75 on the outer peripheral surface of the following auxiliary member 71 respectively correspond to the concave parts 13, and the concave parts 74 on the outer peripheral surface of the following auxiliary member 71 respectively correspond to the projecting parts 14. The widths of the projecting parts 75 are respectively smaller than the widths of the concave parts 74, and a difference of heights H2 between adjacent projecting part 75 and concave part 74 is shorter than the width W3 of the concave part 74 and longer than the width W4 of the projecting part 75. Moreover, the widths W2 of the projecting parts 14 are respectively narrower than the widths W3 of the concave parts 74, and the widths W4 of the projecting parts 75 are respectively narrower than the widths W1 of the concave parts 13.

Consequently, by the insertion of the following auxiliary member 71 formed as above into the case 10, the projecting parts 75 of the following auxiliary member 71 are respectively arranged in the concave parts 13 formed on the inner peripheral surface of the case 10; the projecting parts 14 formed on the inner peripheral surface of the case 10 are respectively arranged in the concave parts 74 of the following auxiliary member 71; and the concave parts 13 and 74 and the projecting parts 14 and 75 engage with each other, respectively. Then, a following body 5 to be described below is packed in a space formed between the outer peripheral surface of the following auxiliary member 71 like this and the inner peripheral surface of the case 10 (between the concave parts 74 and 13 and the projecting parts 14 and 75, respectively).

As the following auxiliary member 71, for example, members made of polypropylene, ethylene-vinyl alcohol copolymer resin, polyacrylonitrile, nylon, polyethylene terephthalate, polycarbonate, polystyrene, polyvinylidene chloride, polyvinyl chloride, or various rubbers can be cited.

The liquid fuel 4 is housed before the following auxiliary member 71 in the inside space of the case 10. The following body 5 made of a liquid, a sol, or a gel that is low in affinity to the liquid fuel 4 is housed behind the liquid fuel 4 in the inside space of the case 10, and the inside space of the case 10 is blocked up by the following body 5. The inside space of the case 10 is comparted by the following body 5 into a region before the following body 5 and a region behind the following body 5. Then, because the following body 5 is laid in the gap between the following auxiliary member 71 and the case 10, the liquid fuel 4 does not leak out from the gap between the following auxiliary member 71 and the case 10. In this manner, the following auxiliary member 71 is situated in the contact portion of the liquid fuel 4 and the following body 5. The front portion of the following auxiliary member 71 soaks in the liquid fuel 4, and the rear portion of the following auxiliary member 71 soaks in the following body 5.

Figure 20A:
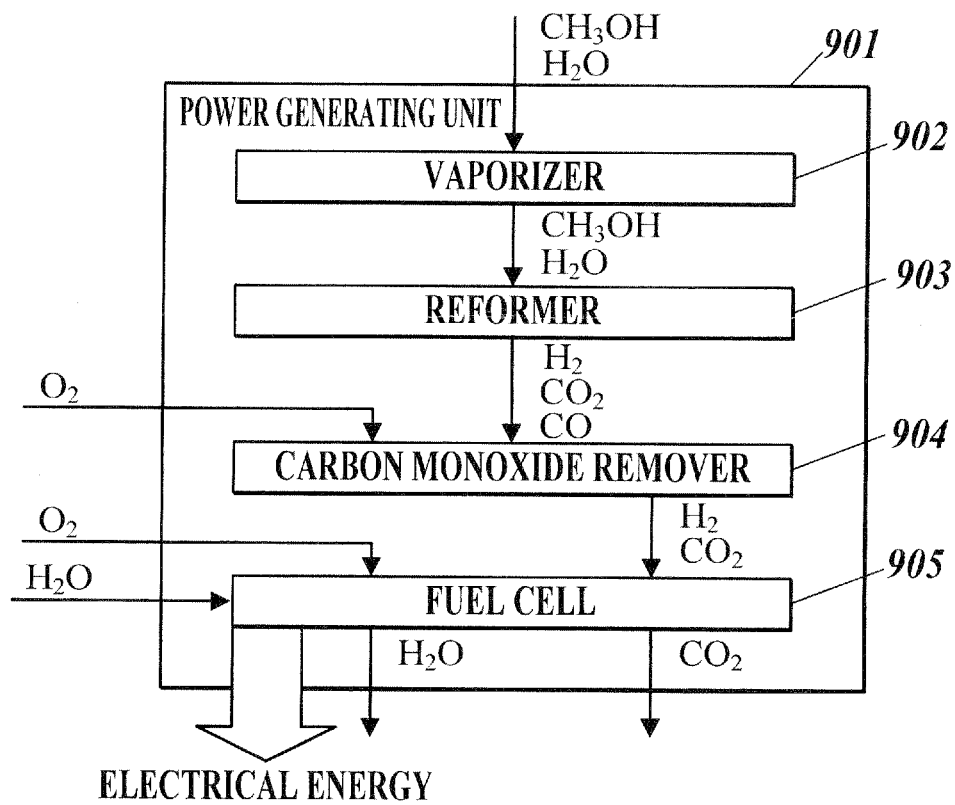
FIG. 20A is a block diagram of a power generating unit 901.
Figure 20B:
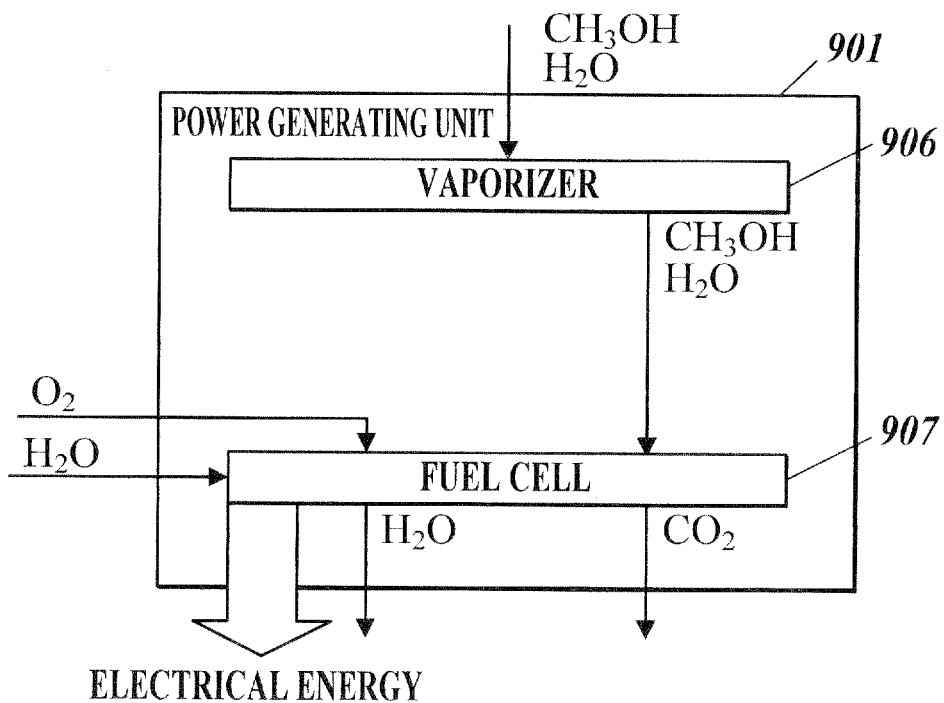
FIG. 20B is a block diagram of a modification showing the power generating unit 901.

Water 6 is housed in the water housing pipe 70. When the water 6 is applied to a power generating unit 901 as shown in FIG. 20A, the water 6 is mixed with the liquid fuel 4 to be supplied to a vaporizer 902, or is supplied to an electrolyte film in advance before hydrogen is supplied to the electrolyte film in order to utilize the water 6 as carriers of protons moving in the electrolyte film of a fuel cell 905. Moreover, when the water 6 is applied to the power generating unit 901 as shown in FIG. 20B, the water 6 is mixed with the liquid fuel 4 to be supplied to a vaporizer 906, or is supplied to an electrolyte film in advance before the fuel is supplied to the electrolyte film in order to be utilized as carriers of protons moving in the electrolyte film in a fuel cell 907. Incidentally, when the fuel is directly supplied to the fuel cell 907 as shown in FIG. 20B, it is unnecessary to directly supply only the water 6 to the electrolyte film for humidification. Moreover, because the fuel batteries 905 and 907 produce water by electrochemical reactions to cause power generation, the produced water can be mixed with the liquid fuel 4 to be supplied to the vaporizers 902 and 906, or can be reused to humidify the fuel batteries 905 and 907. Accordingly, the amount of the water 6 housed in the water housing pipe 70 is suppressed to be utilized at the time of starting the power generating unit 901. The following body 7 made of a liquid, a sol, or a gel is housed behind the water 6 in the water housing pipe 70, and the water housing pipe 70 is blocked up by the following body 7. The front side of the water housing pipe 70 before the following body 7 is packed by the water 6, and the water 6 and the following body 7 contact to each other. The water 6 is sealed by the following body 7. Then, the space behind the following body 7 in the water housing pipe 70 is connected to the space behind the following body 5.

The following body 5 moves to the side of the liquid fuel 4 in the state of keeping the interface with the liquid fuel 4 with the movement of the liquid fuel 4 at the end behind the liquid fuel 4 by the exhaust of the liquid fuel 4 from the fuel exhausting port 31. The following body 5 prevents the leakage and the evaporation of the liquid fuel 4, and prevents the infiltration of air into the liquid fuel 4. The following body 7 moves in the state of contacting with the water 6 with the consumption of the water 6. The following body 7 prevents the leakage and the evaporation of the water 6, and prevents the infiltration of air into the water 6.

The following body 5 has low affinity to the liquid fuel 4. The following body 5 does not dissolve to the liquid fuel 4, and does not diffuse into the liquid fuel 4. More preferably the following body 5 has surface energy lower than that of the liquid fuel 4. The following body 7 has low affinity to the water 6. The following body 7 does not dissolve to the water 6, and does not diffuse into the water 6. More preferably the following body 7 has surface energy lower than that of the water 6.

The following bodies 5 and 7 respectively have the property of a structured viscous fluid (abnormal viscous fluid), in which the apparent stress thereof decreases when the shearing stress (or shearing speed) thereof increases.

As the following bodies 5 and 7, polyglycol, polyester, polybutene, liquid paraffin, spindle oil, the other mineral oils, dimethyl silicone oil, methylphenyl silicone oil, the other silicone oils, aliphatic series metal soap, modified clay, silica gel, carbon black, natural rubber, synthetic rubber, the other synthetic polymer, and combinations of them can be used. Moreover, the materials thickened by adding solvents or the like may be used for the following bodies 5 and 7.

As described above, because the following bodies 5 and 7 respectively have a proper amount of viscosity, the following bodies 5 and 7 tend to keep their forms even when the fuel container 1 is shaken. However, although the following body 5 moves as the liquid fuel 4 in the fuel container 1 decreases, a part of the following body 5 does not move to adhere onto the inner peripheral surface of the container main body 2, and the amount of the following body 5 to hold the interface with the liquid fuel 4 sometimes gradually decreases. Consequently, when the interface area between the liquid fuel 4 and the following body 5 is comparatively large, then the thickness of the following body 5 at the center of the interface becomes thinner as the liquid fuel 4 moves when the following auxiliary member 71 is not provided, and the fuel container 1 soon falls into the state in which the liquid fuel 4 is exposed to easily volatilize. However, because the following auxiliary member 71 which is a solid body, is shaped in comb teeth as described above, the following auxiliary member 71 does not deform even when the liquid fuel 4 moves by vibrations. Consequently, when the thickness of the following body 5 gradually becomes thinner, the following auxiliary member 71 can continue to intervene at the interface with the liquid fuel 4 lest the liquid fuel 4 should volatilize.

A theory is here described by exemplifying the following vibration tests. The theory concerns the superiority of the case where the inner peripheral surface of the case 10 and the outer peripheral surface of the following auxiliary member 71 are particularly shaped in comb teeth to mutually engage as described above in comparison with the case where the inner peripheral surface of the case 10 and the outer peripheral surface of the following auxiliary member 71 are mutually planes because the fuel container 1 does not deform even when it is vibrated under relentless conditions (for example, acceleration of 8 G at frequency of 200 Hz)

[Vibration Tests]

Figure 23:
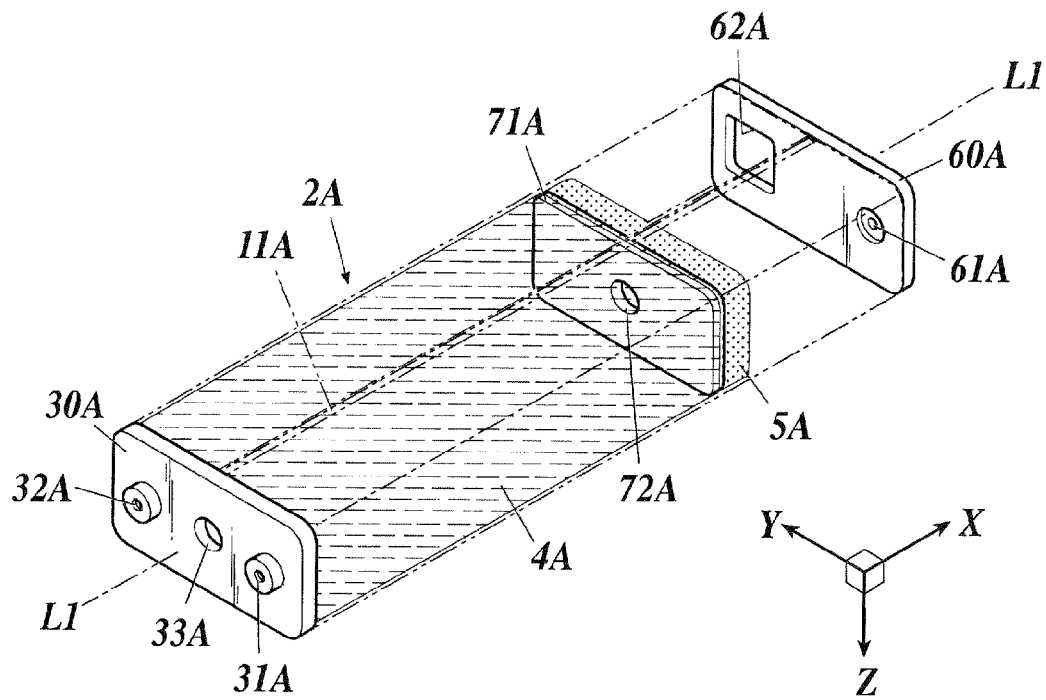
FIG. 23 is a schematic perspective view showing a conventional example of a container main body 2A of a fuel container.
Figure 24:
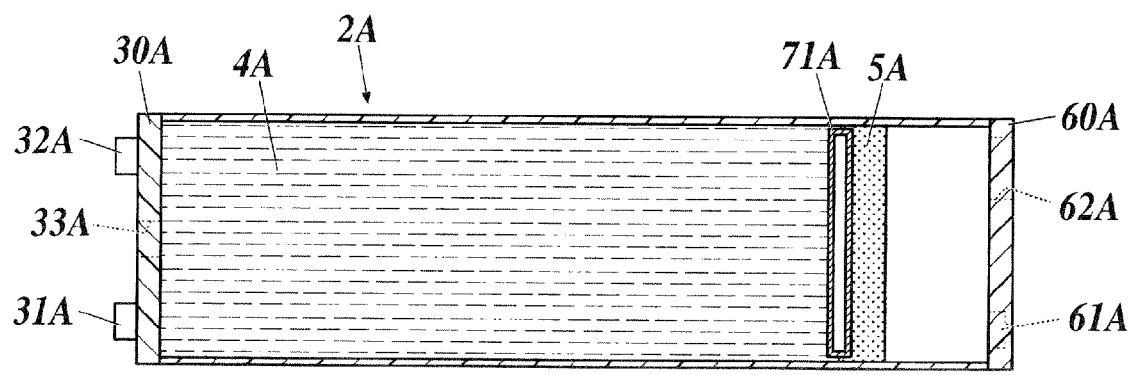
FIG. 24 is an end view of the cross section along the line L1-L1.
Figure 25A:
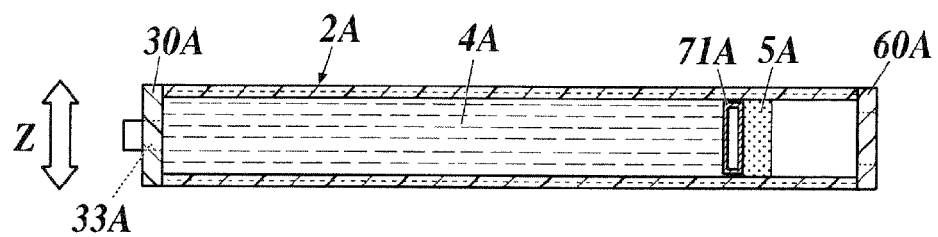
FIG. 25A is an end view of the longitudinal section along the line L1-L1 at the time of vibrations into a Z direction.
Figure 25B:
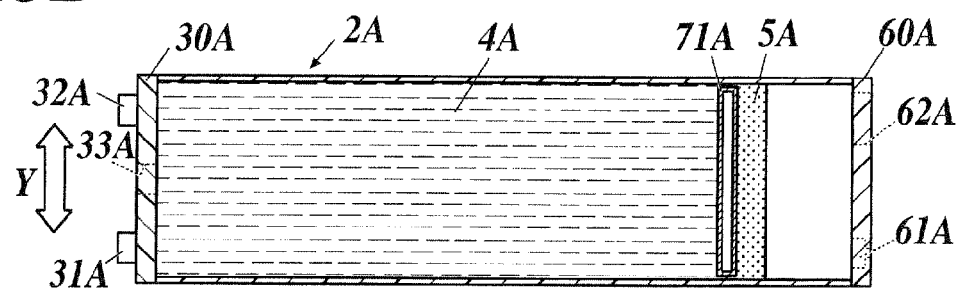
FIG. 25B is an end view of the cross section along the line L1-L1 at the time of vibrations into a Y direction.
Figure 25C:
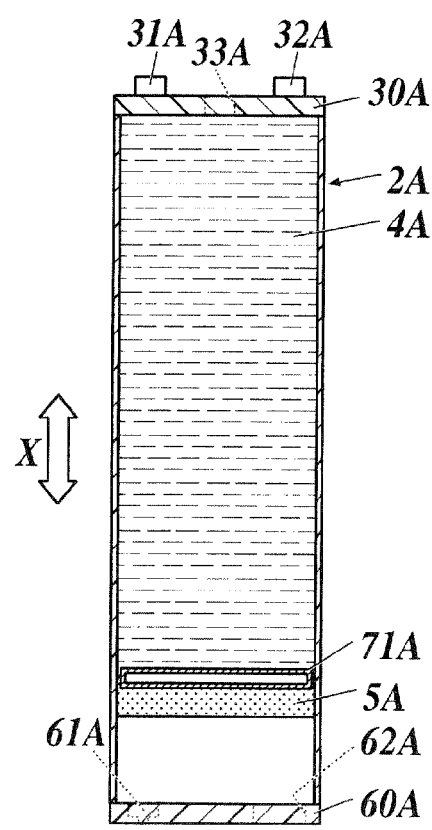
FIG. 25C is an end view of the cross section along the line L1-L1 at the time of vibrations into an X direction.

FIG. 23 is the whole perspective view showing an outline of a container main body 2A of a fuel container showing a conventional example; FIG. 24 is an end view of a cross section along a line L1-L1 in FIG. 23; FIG. 25A is an end view of a longitudinal section along the line L1-L1 at the time of performing vibrations in the Z direction of FIG. 23; FIG. 25B is an end view of the cross section along the line L1-L1 at the time of performing vibrations in the Y direction of FIG. 23; and FIG. 25C is an end view of a cross section along the line L1-L1 at the time of performing vibrations in the X direction of FIG. 23. Incidentally, the graphic representations of the front side inner lid member 20, the rear inner lid member 40, the water housing pipe 70, the following body 7, and the like, are omitted in FIGS. 23-27 to be described below for the sake of drawing. Moreover, the through-hole 72 is graphically represented only in FIG. 23.

The container main body 2A of the conventional example to be used is the one having the planar inner peripheral surface of the case 10A and the planar outer peripheral surface of the following auxiliary member 71A, and the other parts of the container main body 2A are similar to those of the above-mentioned fuel container 1 of the present invention. In the drawings, similar components are denoted by reference marks, each composed of a similar numeral and a letter "A."

The vibration tests were the tests performed on the basis of a draft of a standard of the United Nations (UN) pertaining to a lithium ion battery. The vibration tests were the ones applying vibrations to the container main body 2A as the conventional example. A sine curve waveform was logarithmically swept from 7 Hz to 200 Hz of vibration frequencies for 1 minute, was held for 13 minutes after being heightened to 200 Hz, and was lowered from 200 Hz to 7 Hz for 1 minute after that. The sweeping was then ended. The set of this sweeping was counted as one time (for 15 minutes), and the set was repeated by twelve times into each of the three directions of the Z direction, the Y direction, and the X direction shown in FIG. 23. As for the X direction, the tests were performed by standing the container main body 2A upright in the state in which the following body 5A was situated below the liquid fuel 4A. The total time of the tests was nine hours of the summation of the time in each direction. The peak acceleration of the speed of the logarithmic frequency sweep was kept to be 1 G from the frequency of 7 Hz to the arrival at the frequency of 18 Hz. When the frequency reached 18 Hz, the amplitude thereof was kept to be 0.8 (total displacement of 1.6 mm), and the vibrations were increased until the peak acceleration reached 8 G. After that, the vibrations were increased up to 200 Hz.

[Test Results]

Figure 26A:
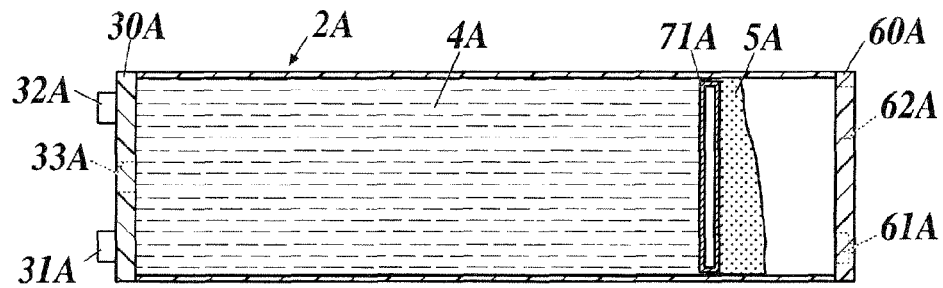
FIG. 26A is a principal part enlarged view of the longitudinal sectional view taken along the line L1-L1 after a vibration test in the Z direction.
Figure 26B:
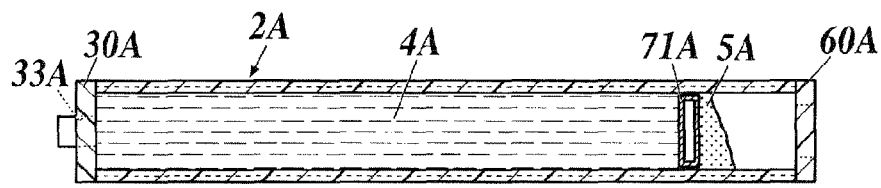
FIG. 26B is a principal part enlarged view of the transverse sectional view taken along the line L1-L1 after a vibration test in the Y direction.
Figure 26C:
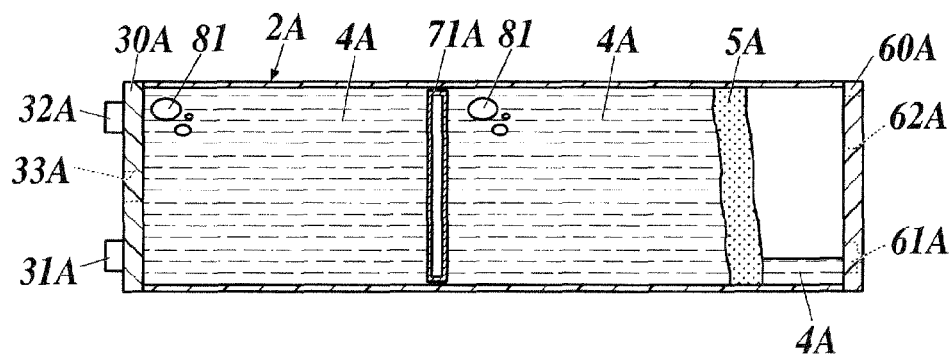
FIG. 26C is a longitudinal sectional view taken along the line L1-L1 after a vibration test in the X direction.

FIG. 26A is a principal part enlarged view of a longitudinal sectional view taken along the line L1-L1 after the vibration tests in the Z direction; FIG. 26B is a principal part enlarged view of a transverse sectional view taken along the line L1-L1 after the vibration tests in the Y direction; FIG. 26C is a longitudinal sectional view taken along the line L1-L1 after the vibration tests in the X direction; and FIG. 26D is a transverse sectional view taken along the line L1-L1 after the vibration tests in the X direction.

As the results of performing the vibration tests of the fuel container in the vibration directions Z and Y, the following body 5A deformed a little as shown in FIGS. 26A and 26B, but the liquid fuel 4A did not leak and no functions of the fuel container were damaged in the case of the vibration directions Z and Y.

Figure 26D:
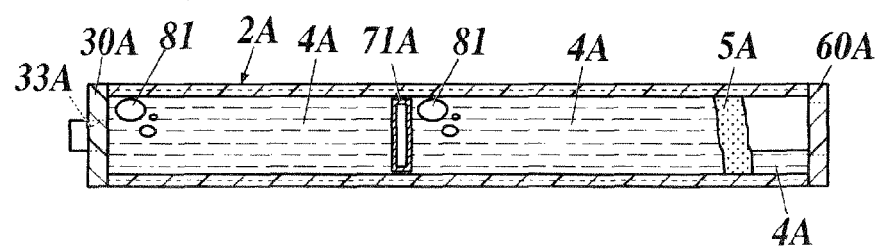
FIG. 26D is a transverse sectional view taken along the line L1-L1 after the a vibration test in the X direction.

In the case of the vibration directions Z and Y, the following body 5A did not exfoliate from the following auxiliary member 71A, but the following body 5A completely exfoliated from the following auxiliary member 71A as shown in FIGS. 26C and 26D in the case of the vibration direction X. Then, the liquid fuel 4A leaked onto the rear portion side, and caused the deterioration of the function of the fuel container. Furthermore, air bubbles 81 were produced between the following auxiliary member 71A and the front side outer lid member 30A. Such air bubbles could cause a detection hazard of a flow rate detection sensor at the time of taking in fuel from the fuel exhausting port 31 quantitatively.

The cause of the exfoliation of the following body 5A from the following auxiliary member 71A is described below. When the following body 5A moves along the inner peripheral surface of the case 10A by vibrations, a speed difference is produced between the following body 5A and the inner peripheral surface of the case 10A because the following body 5A is a fluid having a viscosity. Consequently, a tendency to prevent any movements is produced similarly to the sliding friction of a solid. Then, a force working between the inner peripheral surface of the case 10A and the following body 5A to prevent any movement, that is, a frictional force, is produced. The frictional force is a vector to be generally defied as a shearing force.

Figure 27:
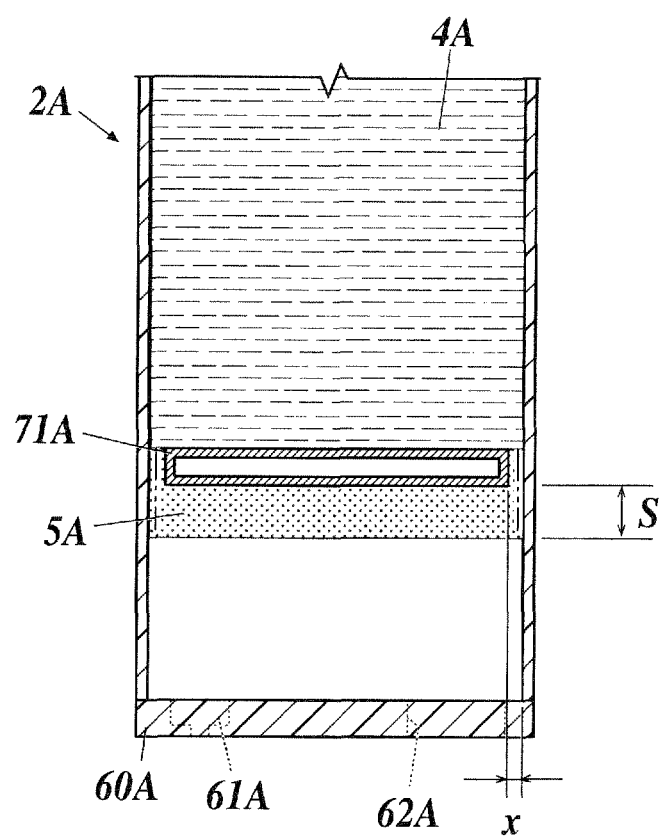
FIG. 27 is a transverse sectional view of the container main body 2A taken along the line L1-L1, showing the relations of the container main body 2A with a following auxiliary member 71A, a following body 5A, and the inner peripheral surface of a case 10A.

FIG. 27 is a transverse sectional view taken along the line L1-L1 of the container main body 2A. FIG. 27 shows the relations among the following auxiliary member 71A, the following body 5A, and the inner peripheral surface of the case 10A.

From FIG. 27, when a speed at which the following body 5A moved when the vibration tests were performed is denoted by a letter u, and when the distance from the following auxiliary member 71A and the inner peripheral surface of the case 10A is denoted by a letter x, and when the viscosity of the following body is denoted by a letter $\mu$, then a shearing force $\tau$ to be produced at the time when a speed difference is produced between the speeds of the following body 5A and the case 10A can be obtained by $\tau=\mu(u/x)$.

Then, when a force larger than the shearing force $\tau$ is applied to the following body 5A, the following body 5A causes a slippage to move. Consequently, as the results of the aforesaid vibration tests, the cause of the exfoliation of the following body 5A from the following auxiliary member 71A is the application of the force larger than the shearing force $\tau$ to the following body 5A. As the cause of the application of the force larger than the shearing force $\tau$, a force F applied to the following body 5A can be obtained by F=ma from a "fuel weight m" and a "vibration speed a".

From the influences of the vibration tests, the force F' per unit area which force is applied to the part where the following body 5A adheres onto the inner peripheral surface can be obtained by F'=F/S where S is an effective contact area of the following body 5A to the inner peripheral surface of the case 1A. Because the force F' per unit area is larger than the shearing force $\tau$, by which the following body 5A contacts with the inner peripheral surface, like a relation of F'>$\tau$, the following body 5A causes the exfoliation from the following auxiliary member 71A.

Therefore, from the relational expressions of F'=F/A and F'>$\tau$=$\mu$(u/x), it is obvious that, when the distance x between the following auxiliary member 71A and the inner peripheral surface of the case 10A is made to be smaller, then the shearing force $\tau$ becomes larger, and that, when the effective contact area S is made to be larger, then force F' becomes smaller in order to make the force F' smaller when the distance x between the solids is constant. For this reason, it can be understood that it is necessary to enlarge the effective contact area S of the following body 5A and the case 1A, or the effective contact area S of the following body 5A and the following auxiliary member 71A in order to suppress the deformation of the following body 5A to improve the resistance against vibrations.

Accordingly, by forming the following auxiliary member 71 to be in comb teeth as the present invention described above, the effective contact areas S between the following body 5 and the case 10 and between the following body 5 and the following auxiliary member 71 increase without enlarging the form of the following auxiliary member 71. Consequently, the force F' per unit area which force is applied to the part where the following body 5 adheres to the inner peripheral surface of the case 10 decreases. As a result, the difference between the shearing force $\tau$ and the force F' per unit area becomes smaller, and it can be suppressed that the following body 5 exfoliates from the following auxiliary member 71. Thereby, no disadvantages come to be produced to the vibrations in the vibration direction X. For example, when the ratios among the widths of the concave parts 74, the widths of the projecting parts 75, and the heights of the concave parts 74 and projecting parts 75 on the side of the following auxiliary member 71 are 1:1:1 as shown in FIGS. 9A and 9B, then the effective contact area S becomes treble, and treble rigidity can be obtained. Furthermore, by the formation in comb teeth, the effective contact area S is increased with the capacities of the following auxiliary member 71 and the following body 5 held to be the ones bearing comparison with those of the conventional example following auxiliary member 71A and following body 5A. Consequently, it is unnecessary to enlarge the size of the following auxiliary member 71 or to increase the amount of the following body 5 in order to increase the effective contact area S, and thereby it is unnecessary to substantially decrease the amount of the liquid fuel 4 capable of being enclosed in the fuel container 1.

Incidentally, the heights and the widths of the concave parts 74 and projecting parts 75 on the side of the following auxiliary member 71, and the heights and the widths of the concave parts 13 and the projecting parts 14 on the side of the case 10 can be suitably changed. By changing the heights and the widths, the design to enlarge the magnifying power furthermore is enabled.

Moreover, although both of the outer peripheral surface of the following auxiliary member 71 and the inner peripheral surface of the case 10 are formed in comb teeth in the above embodiment, it is possible to improve the vibration characteristics to suppress the disadvantages such as exfoliation by increasing the surface area even in the case where only the outer peripheral surface of the following auxiliary member 71 is formed to be comb teeth, or in the case where only the inner peripheral surface of the case 10 is formed to be comb teeth.

The container main body 2 configured as above is packed by the packing medium 9 having a gas shielding performance as shown in FIGS. 1 and 2. The packaging medium 9 preferably packs the container main body 2 by performing the vacuum suction of the inside of the packing medium 9. The packaging medium 9 is a laminated body composed of an intermediate layer put between an upper layer made of polyethylene terephthalate (PET) and a lower layer made of PET similarly. The intermediate layer is made of ethylene-vinyl alcohol copolymer resin (EVOH), polyamide, or polyglycolic acid (PGA), or a mixture of two or more kinds of them. The intermediate layer like this has a gas barrier performance lower than that of PET, and the PET functions as a protection film and a moisture proofing film of the intermediate layer. Consequently, the gas barrier performance depends on the thickness of the intermediate layer most. EVAL (registered trade mark of Kuraray Co., Ltd.) is available as the ethylene-vinyl alcohol copolymer resin, and it is preferable from the point of view of the gas barrier performance that the ethylene-vinyl alcohol copolymer has a lower copolymeric ratio. In particular, L101, F101, H101, and E105 of EVAL (registered trademark) are preferable. Nylon MXD6 (available from Mitsubishi Gas Chemical Company, Inc.) is available as polyamide.

Incidentally, any one of the followings (A)-(E) may be used as the packaging medium 9.

(A) . . . A single layer body of a resin film made of any one of the material selected from the group consisting of polyethylene terephthalate ethylene-vinyl alcohol copolymer resin, polyamide resin, polyglycolic acid, polypropylene, polyvinyl alcohol, polyacrylonitrile, cellophane, polycarbonate, polystyrene, polyvinylidene chloride, and polyvinyl chloride, or a mixture composed of two kinds or more of them.
(B) . . . A laminated body made of a plurality of layers including only one single layer body of (A).
(C) . . . A laminated body made of a plurality of layers including a plurality of the single layer bodies of (A).
(D) . . . A laminated body including a plurality of layers made of a resin film made of a material selected from the group consisting of polyethylene terephthalate ethylene-vinyl alcohol copolymer resin, polyamide resin, polyglycolic acid, polypropylene, polyvinyl alcohol, polyacrylonitrile, cellophane, polycarbonate, polystyrene, polyvinylidene chloride, and polyvinyl chloride, and a resin film made of the kinds other than the group.
(E) . . . A laminated body including a metal evaporated on any one of the resin films of (A)-(D).

The packaging medium 9 is composed of a barrel winding section 91 wound around the barrel of the case 10, a first lug portion 92 extending from the barrel winding section 91 to the front side to seal the front end surface (the front surface of the front side outer lid member 30) of the container main body 2, and a second lug portion 93 extending from the barrel winding section 91 to the rear side to seal the rear end surface (the rear surface of the rear outer lid member 60) of the container main body 2. The fuel exhausting port 31, the air exhausting port 32, and the water exhausting port 33 are covered by the first lug portion 92, and the pressure adjusting port 61 and the air introducing port 62 are covered by the second lug portion 93.

A perforated line 94 along the edge of the front surface of the front side outer lid member 30 is formed between the barrel winding section 91 and the first lug portion 92, and a perforated line 95 along the edge of the rear surface of the rear outer lid member 60 is formed between the barrel winding section 91 and the second lug portion 93. The first lug portion 92 can be easily separated from the barrel winding section 91 by cutting off the packaging medium 9 along the perforated line 94, and the second lug portion 93 can be easily separated from the barrel winding section 91 by cutting off the packaging medium 9 along the perforated line 95. Incidentally, the barrel winding section 91 is preferably adhered to the outer surface of the case 10, the edge of the front side outer lid member 30, the edge of the rear outer lid member 60, the edge of the first layer 21 of the front side inner lid member 20, and the edge of the second layer 42 of the rear inner lid member 40.

Because the container main body 2 at the time of being unused is enclosed in the packaging medium 9, it can be prevented from occurring that the liquid fuel 4 is exhausted from the fuel exhausting port 31, or that the water 6 is exhausted from the water exhausting port 33. Because the air filter 63 is not exposed in the air introducing port 62, the deterioration of the filter can be prevented.

Moreover, because the packaging medium 9 has the gas shielding performance, no evaporated fuels leak even when the container main body 2 itself does not have the gas shielding performance. Because the container main body 2 is not required to have the gas shielding performance, the scope of the selection of the materials of the container main body 2 is widened, and any materials can be used as that of the container main body 2. In particular, resins having lower gas shielding performances can be used as the material of the container main body 2, and the container main body 2 can be formed to be light.

When the water 6 and the liquid fuel 4 are supplied from the container main body 2 to the electronic equipment mounted with a fuel cell or the like, the first lug portion 92 is separated from the barrel winding section 91 along the perforated line 94 by pulling off the first lug portion 92, and the fuel exhausting port 31, the air exhausting port 32, and the water exhausting port 33 are thereby exposed. The second lug portion 93 is similarly separated from the barrel winding section 91 along the perforated line 95 by pulling off the second lug portion 93, and the pressure adjusting port 61 and the air introducing port 62 are thereby exposed. After that, the container main body 2 in the state in which the barrel winding section 91 remains is set in the equipment.

Figure 17:
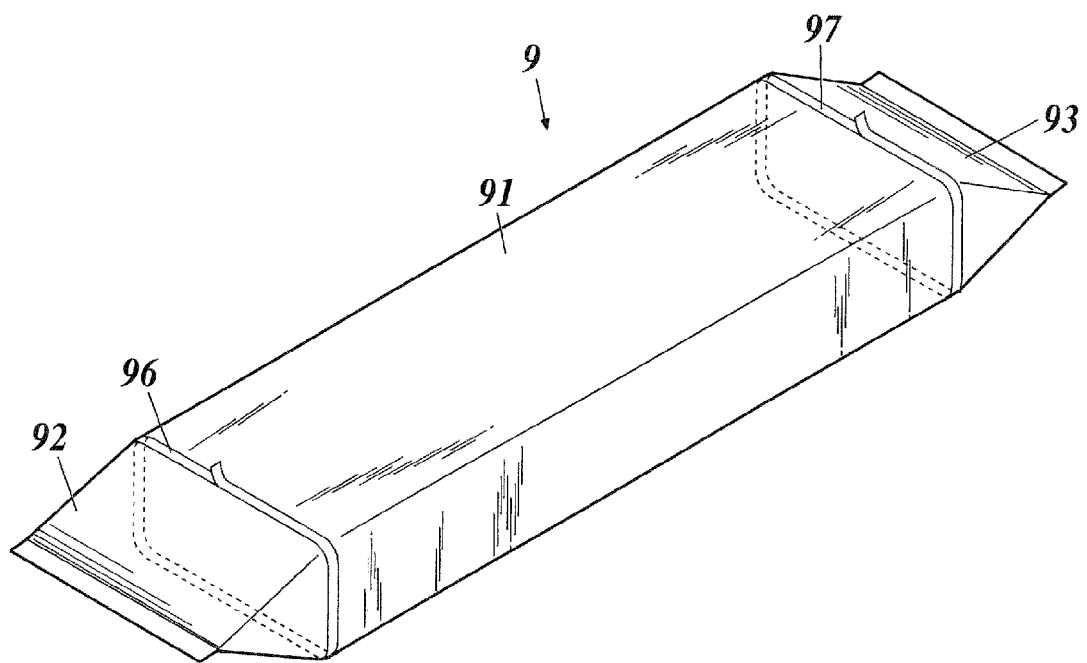
FIG. 17 is a perspective view of a modification of a packaging medium 9.

Incidentally, a little cut is formed at a part between the barrel winding section 91 and the first lug portion 92, and a cutting guide tape 96 is provided along the circumference of the front side outer lid member 30 so that the end of the cutting guide tape 96 overlaps with the cut as shown in FIG. 17. Then, the first lug portion 92 may be torn off by pulling the cutting guide tape 96. It is preferable to provide the perforated line 94 below the cutting guide tape 96 lest the flow path grooves 11 and 12 should be exposed.

Also on the backside similarly, a little cut is formed at a part between the barrel winding section 91 and the second lug portion 93, and a cutting guide tape 97 is provided along the circumference of the front surface of the rear outer lid member 60 so that the end of the cutting guide tape 97 overlaps with the cut. The second lug portion 93 may be torn off by pulling the cutting guide tape 97 into the circumferential direction of the rear outer lid member 60. The perforated line 95 is preferably formed below the cutting guide tape 97 lest the flow path grooves 11 and 12 should be exposed.

Figure 18:
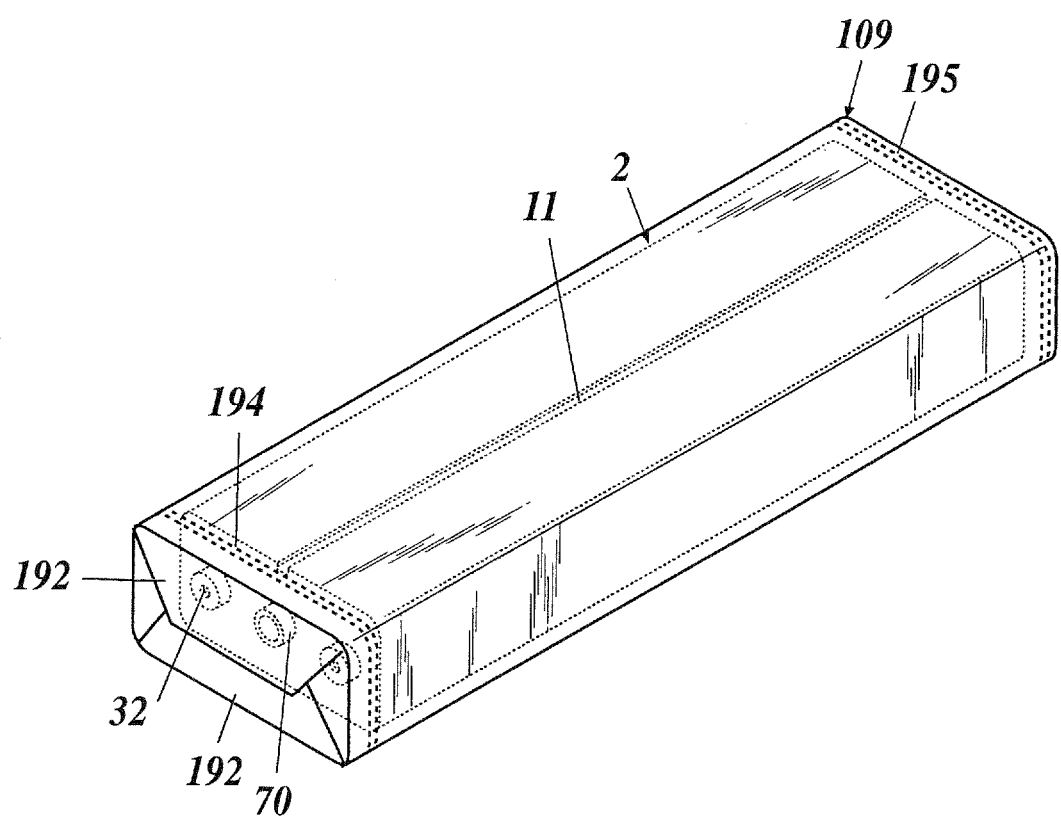
FIG. 18 is a perspective view of a state in which the container main body 2 is packed by another packaging medium 109.

The container main body 2 may be packed by a packaging medium 109 as shown in FIG. 18 instead of the packaging medium 9. The packaging medium 109 is formed of a synthetic resin, which is not sufficiently permeated by air. The packaging medium 109 preferably packs the container main body 2 by being subjected to the vacuum suction of the inside of the packing medium 109.

Figure 19:
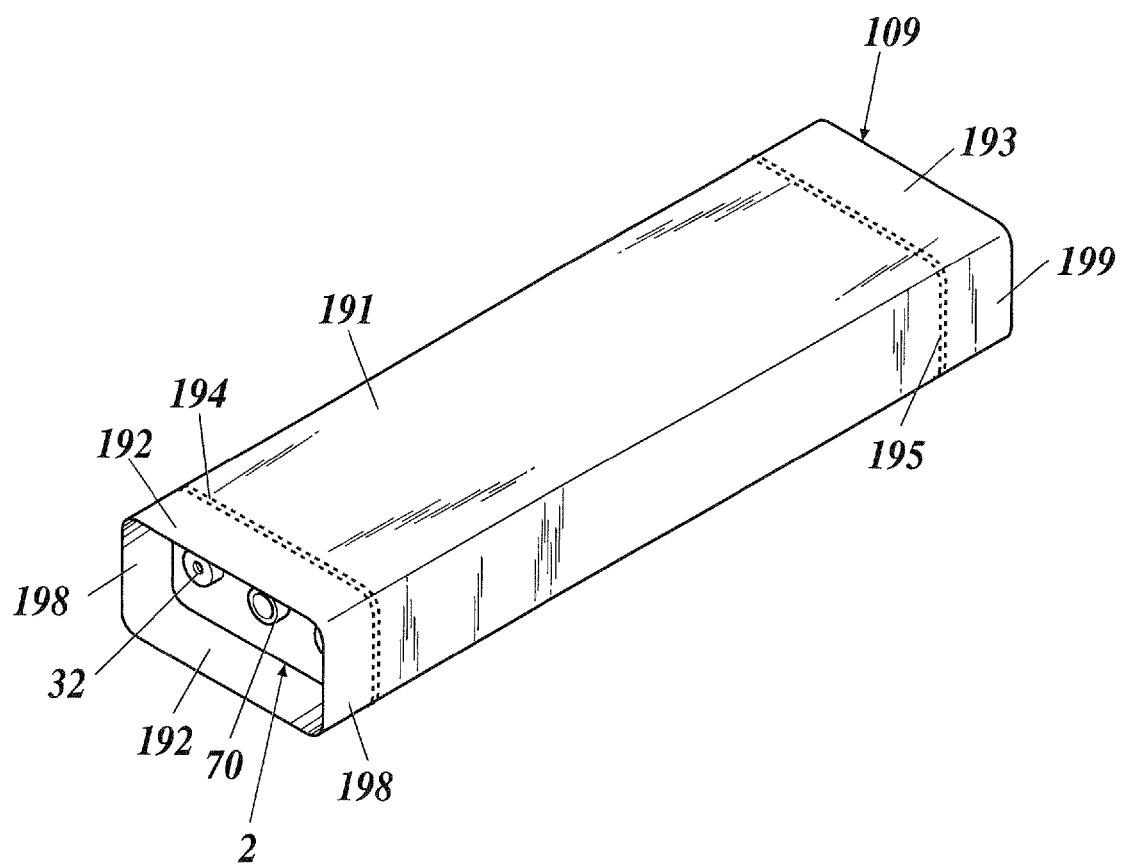
FIG. 19 is a perspective view for illustrating a packing process of the packaging medium 109.

The packing of the container main body 2 with the packaging medium 109 is performed in accordance with the following process. As shown in FIG. 19, the packaging medium 109 is wound around the barrel of the case 10 lest the packaging medium 109 should be embedded in the flow path grooves 11 and 12, and the barrel winding section 191 of the packaging medium 109 is adhered closely to the outer surface of the case 10. Then, a pair of lug portions 192 extending from the front surface of the front side outer lid member 30 on the side of the short sides is antecedently bent inward, and a pair of lug portions 198 on the side of the long sides is subsequently bent to adhere the overlapped parts of the lug portions 192 and 198 to each other. The front surface of the front side outer lid member 30 is thereby covered by the lug portions 192 and 198 to obstruct the fuel exhausting port 31, the air exhausting port 32, and the water exhausting port 33 with the lug portions 192 and 198. Also as for the backside, similarly, a pair of lug portions 193 extending from the rear surface of the rear outer lid member 60 on the side of the short sides is bent, and a pair of lug portions 199 on the side of the long sides is subsequently bent to adhere the overlapped parts of the lug portions 193 and 199. The rear surface of the rear outer lid member 60 is thereby covered by the lug portions 193 and 199 to obstruct the pressure adjusting port 61 and the air introducing port 62 with the lug portions 193 and 199.

When the container main body 2 is packed as described above, the fuel exhausting port 31, the air exhausting port 32, and the water exhausting port 33 are covered by the lug portions 192 and 198 of the packaging medium 9, and the pressure adjusting port 61 and the air introducing port 62 are covered by the lug portions 193 and 199. Consequently, the preservation performance of the liquid fuel 4 housed in the case 10 can be enhanced. Despite the packing having such a high preservation performance, the structure thereof is simple.

As shown in FIGS. 18 and 19, a perforated line 194 along the edge of the front surface of the front side outer lid member 30 is formed in the packaging medium 109, and a perforated line 195 along the edge of the rear surface of the rear outer lid member 60 is formed in the packaging medium 109. Then, the fuel exhausting port 31, the air exhausting port 32, and the water exhausting port 33 are exposed at the time of use by cutting off the lug portions 192 and 198 along the perforated line 194. On the other hand, the pressure adjusting port 61 and the air introducing port 62 are exposed by cutting off the lug portions 193 and 199 along the perforated line 195. As described above, because the perforated lines 194 and 195 are formed, a user can simply cut off the lug portions 192, 193, 198, and 199 at the time of the use of the fuel container 1, and can expose the fuel exhausting port 31, the air exhausting port 32, the water exhausting port 33, the pressure adjusting port 61, and the air introducing port 62.

Because the remaining barrel winding section 191 is wound around the barrel of the case 10 in the state in which the lug portions 192, 193, 198, and 199 are cut off, the above-mentioned flow paths for air are formed. Furthermore, it can be prevented by the barrel winding section 191 that the air passing through the flow path grooves 11 and 12 has diffused before the air reaches the air exhausting port 32.

At the time of use, as described above, the edges of the front side outer lid member 30, the front side inner lid member 20, the rear inner lid member 40, and the rear outer lid member 60, and the whole side surface of the case 10, except for the front surface of the front side outer lid member 30 and the rear surface of the rear outer lid member 60, are covered by the barrel winding section 91 or 191 to be packed. Then, the side surfaces, except for the flow path grooves 11 and 12, are adhered closely or stuck to the barrel winding section 91 or 191. The flow path grooves 11 and 12 are covered by the barrel winding section 91 or 191, and a flow paths to flow the air from the outside of the container main body 2, which air is taken in through the air introducing port 62, to the air exhausting port 32 are thereby formed.

As described above, the flow path grooves 11 and 12 are formed on the external side surfaces of the case 10, and the flow path grooves 11 and 12 are covered by the barrel winding section 91 or 191, which is made of a thin synthetic resin having a thickness of 1 mm or less. The flow paths to flow the air are thus formed. Consequently, it is unnecessary to provide a thick pipe to flow the air, or the like, in the container main body 2. The amount of housing of the liquid fuel 4 to the capacity of the container main body 2 can be consequently increased.

The container main body 2 with the remaining barrel winding section 91 or 191 is attached to electronic equipment mounted with a fuel cell or the like, and the container main body 2 supplies the liquid fuel 4 and the water 6 to the electronic equipment. When the liquid fuel 4 in the container main body 2 is exhausted, the container main body 2 is removed from the electronic equipment, and the container main body 2 of a new fuel container 1 is attached to the electronic equipment. The electronic equipment is adapted to generate electric power by the use of the fuel cell using the liquid fuel 4, and to be operated by the generated electric power. In the following, the electric equipment, to which the container main body 2 is attached, is described.

The electronic equipment comprises a fuel introducing pipe, an air introducing pipe, and a water introducing pipe. The fuel introducing pipe corresponds to the fuel exhausting port 31; the air introducing pipe corresponds to the air exhausting port 32; and the water introducing pipe corresponds to the front end of the water housing pipe 70. Then, the container main body 2 is attached to the electronic equipment with the front surface of the front side outer lid member 30 of the container main body 2 facing the electronic equipment. The fuel introducing pipe is hereby inserted into the fuel exhausting port 31, and the fuel introducing pipe is furthermore inserted into the check valve 35, so that the check valve 35 is opened by the fuel introducing pipe. Similarly, the air introducing pipe is inserted into the check valve 36 in the air exhausting port 32, and the water introducing pipe is inserted into the check valve 73 in the water housing pipe 70. The liquid fuel 4 in the container main body 2 hereby passes through the fuel introducing pipe to be supplied to the electronic equipment, and the water 6 in the water housing pipe 70 passes through the water introducing pipe to be supplied to the electronic equipment. Furthermore, the external air is imbibed into the slit 48 through the air filter 63, and is furthermore supplied from the slit 48 to the electronic equipment through the flow path grooves 11 and 12, the slit 25, and the air introducing pipe.

Because the fuel exhausting port 31, the air exhausting port 32, and the water exhausting port 33 are formed on the same surface (that is, on the front surface of the front side outer lid member 30), the fuel exhausting port 31, the air exhausting port 32, and the water exhausting port 33 are connected to the electronic equipment at the same time by only one simple mounting operation. Consequently, the mounting operation of the container main body 2 can be easily performed.

Moreover, the air filter 63 is clogged as the container main body 2 has been being used. However, because the air filter 63 is attached to the container main body 2, the air filter 63 can be also exchanged by the exchange of the container main body 2 together. Consequently, the inspection of the air filter 63 is unnecessary.

As shown in FIGS. 3 and 6, as the liquid fuel 4 in the container main body 2 is decreasing, a shearing stress is generated in the following body 5 with the decrease of the liquid fuel 4, and the viscosity coefficient of the following body 5 lowers. As the liquid fuel 4 is consumed, the following body 5 follows the liquid surface in the state of contacting with the liquid surface on the side of the rear end of the liquid fuel 4. As the liquid fuel 4 is consumed, also the following auxiliary member 71 follows the liquid surface on the rear end side in the state of contacting with the liquid fuel 4 and the following body 5.

On the other hand, as the water 6 in the water housing pipe 70 is decreasing, a shearing stress is generated in the following body 7 with the decrease of the water 6, and the viscosity coefficient of the following body 7 lowers. Then, as the water 6 is consumed, the following body 7 follows the liquid surface in the state of contacting with the liquid surface on the rear end side of the water 6. When the liquid fuel 4 and the water 6 have decreased, the following body 5 and the space on the backside of the following body 5 are depressurized, and the check valve 64 is opened by the depressurizing of the space, so that air is supplied into the space. Consequently, the space can be always kept at almost the atmospheric pressure. Incidentally, the following bodies 7 and 5 are respectively composed of a material that is hard to move correspondingly to an instantaneously produced shearing stress.

The electronic equipment incorporates the power generating unit 901 shown in FIG. 20 therein. The power generating unit 901 performs power generation by the use of the liquid fuel 4 in the fuel container 1, and is configured as shown in FIG. 20A or 20B. In either of the cases of FIGS. 20A and 20B, methanol has been cited as an example of the liquid fuel 4, but the other compounds including hydrogen elements, such as alcohols and gasoline, may be used.

In the case of FIG. 20A, the power generating unit 901 comprises the vaporizer 902, a reformer 903, a carbon monoxide remover 904, and the fuel cell 905.

The water 6 is supplied to the electrolyte film of the fuel cell 905 by a pump immediately before starting a power generating operation, and the electrolyte film is set to be in a state capable of moving sufficient protons to be described below. Then, the liquid fuel 4 and the water 6 are respectively supplied to the power generating unit 901 by a pump to be mixed there. Then, the mixed liquid of the liquid fuel 4 and the water 6 is first supplied to the vaporizer 902. In the vaporizer 902, the supplied mixed liquid is heated to be evaporated, and becomes a mixed gas of the fuel and the water. The mixed gas produced in the vaporizer 902 is supplied to the reformer 903.

In the reformer 903, hydrogen and carbon dioxide are produced from the mixed gas supplied from the vaporizer 902. To put it concretely, the mixed gas reacts to produce the carbon dioxide and the hydrogen in accordance with chemical reaction formula (1) with a catalyst.

$$CH_3OH + H_2O \rightarrow 3H_2 + CO_2 \quad (1)$$

In the reformer 903, sometimes methanol and water vapor are not reformed to the carbon dioxide and the hydrogen completely. In such cases, the methanol and the water vapor react to produce carbon dioxide and carbon monoxide in accordance with chemical reaction formula (2).

$$H_2 + CO_2 \rightarrow H_2O + CO \quad (2)$$

The mixed gas produced in the reformer 903 is supplied to the carbon monoxide remover 904.

In the carbon monoxide remover 904, the carbon monoxide included in the mixed gas supplied from the reformer 903 is selectively oxidized to be removed from the mixed gas. To put it concretely, the carbon monoxide specifically selected from the mixed gas supplied from the reformer 903 and the oxygen in the air sent from the air exhausting port 32 of the container main body 2 by the pump react with each other by the catalyst, and thereby carbon dioxide is produced.

$$2CO + O_2 \rightarrow 2CO_2 \quad (3)$$

Then, the mixed gas is supplied from the carbon monoxide remover 904 to the fuel electrode of the fuel cell 905.

A the fuel electrode of the fuel cell 905, a hydrogen gas in the mixed gas supplied from the carbon monoxide remover 904 is subjected to the operation of the catalyst of the fuel electrode to be separated to hydrogen ions and electrons as shown in electrochemical reaction formula (4). The hydrogen ions are conducted to an air electrode through the solid polymeric electrolyte film of the fuel cell 905, and the electrons are taken out with a fuel electrode.

$$3H_2 \rightarrow 6H^+ + 6e^- \quad (4)$$

Air is sent from the air exhausting port 32 to the air electrode of the fuel cell 905 by the pump. Then, as shown in electrochemical reaction formula (5), oxygen in the air, hydrogen ions that have passed through the solid polymeric electrolyte film, and electrons react with one another to produce water as a by-product.

$$6H^+ + 3/2O_2 + 6e^- \rightarrow 3H_2O \quad (5)$$

As described above, the electrochemical reactions shown by the formulae (4) and (5) are caused at the fuel cell 905, and electrical energy is thereby generated. The produced water and the mixed gas of carbon dioxide, air, and the like, as products are exhausted to the outside.

In the case of FIG. 20B, the power generating unit 901 comprises the vaporizer 906 and the fuel cell 907.

The water 6 is supplied to the electrolyte film of the fuel cell 907 by a pump immediately before starting a power generating operation, and the electrolyte film is set to be in a state capable of moving sufficient protons to be described below. Then, the liquid fuel 4 and the water 6 are respectively supplied to the power generating unit 901 by a pump to be mixed there. Then, the mixed liquid is evaporated in the vaporizer 906, and becomes a mixed gas of methanol and water vapor. The mixed gas produced in the vaporizer 906 is supplied to the fuel electrode of the fuel cell 907.

At the fuel electrode of the fuel cell 907, as shown by electrochemical reaction formula (6), the mixed gas supplied from the vaporizer 906 is separated to hydrogen ions, electrons, and carbon dioxide under the operation of the catalyst of the fuel electrode. The hydrogen ions are conducted to the air electrode through the solid polymeric electrolyte film, and electrons are taken out with the fuel electrode.

$$CH_3OH + H_2O \rightarrow CO_2 + 6H^+ + 6e^- \quad (6)$$

The air sent from the air exhausting port 32 of the container main body 2 by the pump is sent to the air electrode of the fuel cell 907. Then, as shown in electrochemical reaction formula (7), the oxygen in the air, the hydrogen ions passed through the solid polymeric electrolyte film, and the electrons taken out from the fuel electrode react with one another to produce water.

$$6H^+ 3/2O_2 + 6e^- \rightarrow 3H_2O \quad (7)$$

As described above, electrical energy is generated by the occurrence of the electrochemical reactions shown by the formulas (6) and (7) in the fuel cell 907. The generated water, and the mixed gas of carbon dioxide, air, and the like, as products are exhausted to the outside.

The water 6 housed in the container main body 2 is used at the time of the initial operation of the power generating unit 901, the water produced in the fuel batteries 905 and 907 is sent into the vaporizers 902 and 906, respectively, when the water 6 in the container main body 2 is used up.

When the power generating unit 901 is provided in a piece of electronic equipment, such as a cellular phone, a notebook-size personal computer, a digital camera, a personal digital assistance (PDA), and an electronic organizer, then the fuel container 1 is freely attachable and detachable to the electronic equipment, and the electronic equipment operates by the electrical energy generated by the power generating unit 901.

Figure 21:
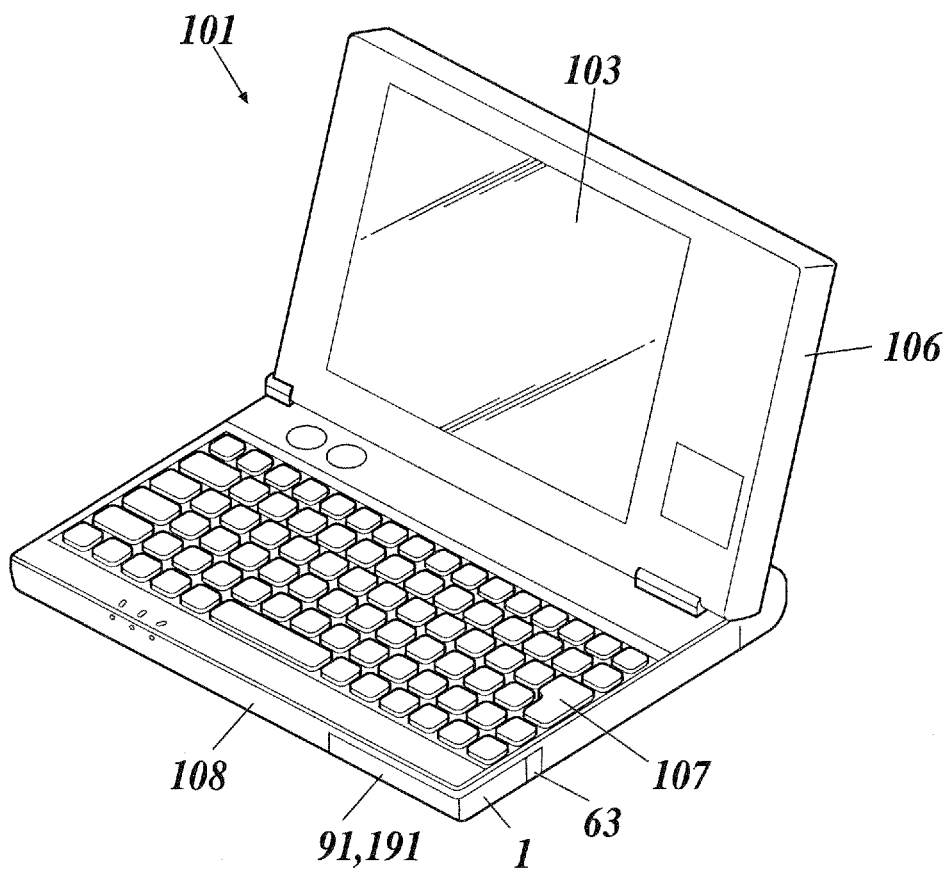
FIG. 21 is a schematic perspective view of electronic equipment 101 in which the fuel container 1 is housed.
Figure 22:
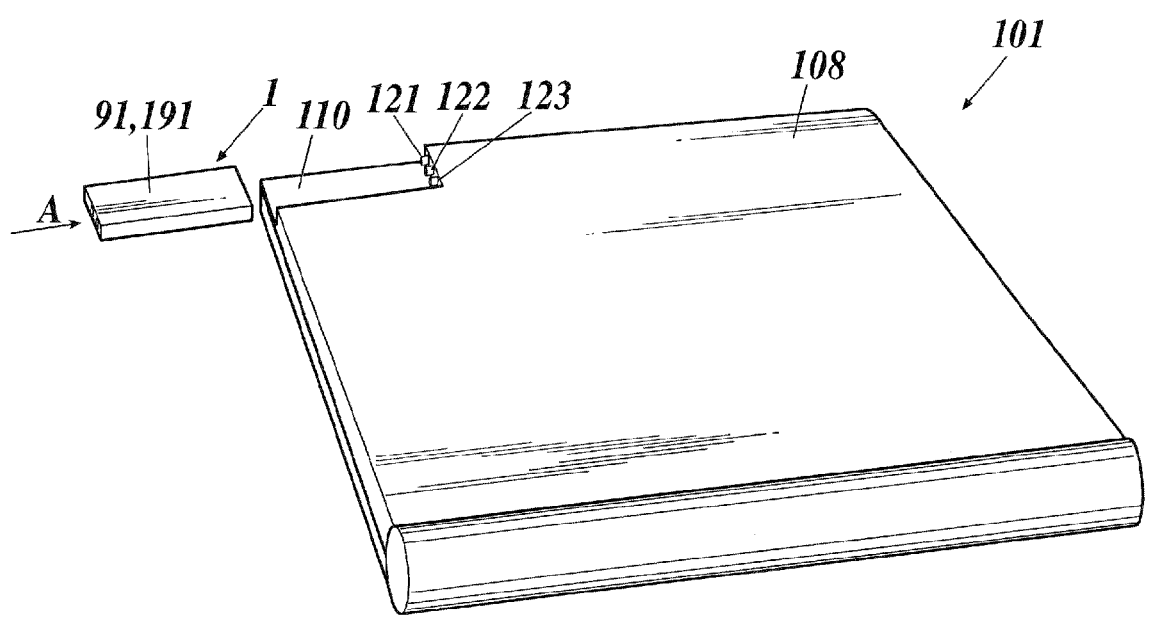
FIG. 22 is a schematic perspective view showing the back surface of the electronic equipment 101.

FIGS. 21 and 22 show the case of applying a notebook-size personal computer as electronic equipment 101. The electronic equipment 101 of the present embodiment comprises a first housing 106 including a display section 103, and a second housing 108 including an input section 107, and the first housing 106 and the second housing 108 are mutually coupled with a hinge structure.

Moreover, the second housing 108 comprises a housing section 110, in which the fuel container 1 can be freely housed. In the housing section 110, attachment ports 121, 122, and 123 corresponding to the fuel exhausting port 31, the air exhausting port 32, and the water exhausting port 33 of the fuel container 1, respectively, are exposed. The display section 103 comprises a back light type liquid crystal display panel, an electroluminescence (EL) display panel, or the like. The display section 103 performs screen displaying on the basis of an electric signal output from a control section to display character information, an image, and the like. The input section 107 comprises various buttons, such as function keys, ten keys, and character inputting keys. When a depression operation of a button projecting to the outside of the second housing 108, the button is elastically deformed, and a movable contact in the button is contacted with a fixed contact on a board in the state capable of being contacted and being separated. Then, an electric signal is output. The control section of the electronic equipment 101 comprises operation means, such as a central processing unit (CPU), and storage means, such as a memory, and performs the processing or the operations of an input electric signal by cooperating with the software read into the computer.

When the outer surface of the front side outer lid member 30 of the fuel container 1 is inserted into the direction of an arrow A toward the housing section 110 of the electronic equipment 101, the fuel exhausting port 31 is fitted into the attachment port 121; the air exhausting port 32 is fitted into the attachment port 122; and the water exhausting port 33 of the front end portion of the water housing pipe 70 is fitted into the attachment port 123. At the same time, the fuel introducing pipe of the electronic equipment 101 is inserted into the fuel exhausting port 31, and the check valve 35 is opened by the fuel introducing pipe; the air introducing pipe is inserted into the air exhausting port 32, and the check valve 36 is opened; and the water introducing pipe is inserted into the water exhausting port 33, and the check valve 73 is opened.

The fuel container 1 is preferably set so that the air filter 63 is exposed from the side surface of the electronic equipment 101 in the state of being housed in the electronic equipment 101, and is preferably in the shape of not projecting from the side surface and the lower part of the electronic equipment 101. When the fuel container 1 is removed from the electronic equipment 101, the fuel container 1 may be pulled out into the reverse direction of the arrow A.

Because the case 10 is sealed by the barrel winding sections 91 and 191 of the packaging media 9 and 109, respectively, even in the case where the fuel container 1 is loaded in the electronic equipment 101 like this, the airtightness of the fuel container 1 can be improved.

As described above, according to the embodiments of the present invention, the inner peripheral surface of the case 10 and the outer peripheral surface of the following auxiliary member 71, which are mutually opposed, are respectively shaped in comb teeth; the projecting parts 75 on the side of the following auxiliary member 71 are located in the concave parts 13 on the side of the case 10; the projecting parts 14 on the side of the case 10 are located in the concave parts 74 on the side of the following auxiliary member 7; and the inner peripheral surface of the case 10 and the outer peripheral surface of the following auxiliary member 71 thus form the mutually engaging forms. Consequently, the effective contact area S between the following body 5 and the inner peripheral surface of the case 10 and the effective contact area S between the following body 5 and the outer peripheral surface of the following auxiliary member 71 respectively increase. The force F' per unit area to be applied to the part of the following body 5 adhering to the inner peripheral surface of the case 10 thereby decreases. Consequently, it becomes possible to suppress the exfoliation of the following body 5 from the following auxiliary member 71, and the case 10 is not deformed by any of the vibrations under the relentless conditions. Thus, the rigidity thereof can be raised. As a result, the vibration characteristics thereof can be easily improved without changing the fill factor of the liquid fuel 4.

Incidentally, the present invention is not limited to the above embodiments, and various improvements and changes of the design thereof may be performed without departing from the scope of the present invention.

For example, although the concave parts 13 and the projecting parts 14 formed on the inner peripheral surface of the case 10 and the concave parts 74 and the projecting parts 75 formed on the outer peripheral surface of the following auxiliary member 71 are made to be rectangular, they may be conical as long as they are the forms to enable the concave parts 13 on the side of the case 10 to engage with the projecting parts 75 on the side of the following auxiliary member 71, and to enable the concave parts 74 on the side of the following auxiliary member 71 to engage with the projecting parts 14 on the side of the case 10.

Moreover, because what is required is to increase the effective contact area S between the following body 5 and the inner peripheral surface of the case 10 and the effective contact area S between the following body 5 and the outer peripheral surface of the following auxiliary member 71, it is sufficient to form at least one of the inner peripheral surface of the case 10 and the outer peripheral surface of the following auxiliary member 71 to be comb teeth instead of forming both the surfaces to be comb teeth.

Furthermore, the packing process of the packaging media 9 and 109 are not limited to the ones described above.

INDUSTRIAL APPLICABILITY

According to the present invention, the effective contact area between the following body and the fuel container or between the following body and the following auxiliary member is increased, and thereby the deformation of the following body can be suppressed, and the vibration characteristics can be improved.

The invention claimed is:

1. A fuel container comprising:
    a container main body in which a liquid fuel is housed and a fuel exhausting port to exhaust the liquid fuel to an outside is formed;
    a following auxiliary member which is solid, and situated on an end side of the liquid fuel in the container main body, the following auxiliary member moving to a side of the fuel exhausting port as the liquid fuel is exhausted; and
    a following body situated on the end side of the liquid fuel, and packed in a space between an inner peripheral surface of the container main body and an outer peripheral surface of the following auxiliary member, wherein the following body comprises one of a liquid, a sol, and a gel, and wherein the following body moves to the fuel exhausting port as the liquid fuel is exhausted, wherein at least one of the inner peripheral surface of the container main body and the outer peripheral surface of the following auxiliary member includes a concave portion and a projecting portion, and wherein the following body directly contacts with the inner peripheral surface of the container main body and the outer peripheral surface of the following auxiliary member.

2. The fuel container according to claim 1, wherein each of the inner peripheral surface of the container main body and the outer peripheral surface of the following auxiliary member includes the concave portion and the projecting portion, such that the concave portion of the inner peripheral surface of the container main body faces the projecting portion of the outer peripheral surface of the following auxiliary member, and the concave portion of the outer peripheral surface of the following auxiliary member faces the projecting portion of the inner peripheral surface of the container main body.

3. The fuel container according to claim 2, wherein the inner peripheral surface of the container main body and the outer peripheral surface of the following auxiliary member respectively have comb teeth-shape.

4. The fuel container according to claim 1, wherein at least one surface of the inner peripheral surface of the container main body and the outer peripheral surface of the following auxiliary member has a surface area larger as compared with a case where said one surface is smooth.

5. The fuel container according to claim 2, wherein at least one surface of the inner peripheral surface of the container main body and the outer peripheral surface of the following auxiliary member has a surface area larger as compared with a case where said one surface is smooth.

6. The fuel container according to claim 3, wherein at least one surface of the inner peripheral surface of the container main body and the outer peripheral surface of the following auxiliary member has a surface area larger as compared with a case where said one surface is smooth.

* * * * *